(12) United States Patent
Larson et al.

(10) Patent No.: US 8,396,831 B2
(45) Date of Patent: Mar. 12, 2013

(54) OPTIMISTIC SERIALIZABLE SNAPSHOT ISOLATION

(75) Inventors: Per-Ake Larson, Redmond, WA (US); Cristian Diaconu, Kirkland, WA (US); Michael J. Zwilling, Redmond, WA (US); Craig Steven Freedman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 12/641,961

(22) Filed: Dec. 18, 2009

(65) Prior Publication Data

US 2011/0153566 A1   Jun. 23, 2011

(51) Int. Cl.
    *G06F 17/00* (2006.01)
(52) U.S. Cl. .................................. 707/638; 707/690
(58) Field of Classification Search .................. 707/687
    See application file for complete search history.

(56) References Cited

U.S. PATENT DOCUMENTS

| | | | |
|---|---|---|---|
| 5,212,788 A | | 5/1993 | Lomet et al. |
| 5,485,607 A * | | 1/1996 | Lomet et al. ........................... 1/1 |
| 5,504,899 A | | 4/1996 | Raz |
| 5,551,023 A * | | 8/1996 | Alonso .......................... 707/703 |
| 5,701,480 A | | 12/1997 | Raz |
| 5,870,758 A * | | 2/1999 | Bamford et al. ....................... 1/1 |
| 6,754,657 B2 * | | 6/2004 | Lomet .................................. 1/1 |
| 7,233,947 B2 | | 6/2007 | Lomet |
| 7,243,088 B2 | | 7/2007 | Verma |
| 7,424,499 B2 | | 9/2008 | Lomet |
| 7,743,083 B2 | | 6/2010 | Bhogi et al. |
| 8,032,496 B2 * | | 10/2011 | Sinha et al. .................... 707/685 |
| 2004/0078379 A1 * | | 4/2004 | Hinshaw et al. ............... 707/100 |
| 2004/0213387 A1 * | | 10/2004 | Chandrasekaran ........ 379/93.24 |
| 2005/0050112 A1 | | 3/2005 | Chandrasekaran |
| 2006/0259518 A1 * | | 11/2006 | Lomet et al. .................. 707/201 |
| 2007/0198781 A1 * | | 8/2007 | Dice et al. ..................... 711/145 |
| 2008/0034172 A1 * | | 2/2008 | Duffy et al. .................... 711/156 |
| 2008/0228795 A1 | | 9/2008 | Lomet |
| 2008/0270489 A1 | | 10/2008 | Kharatishvili |
| 2009/0132535 A1 | | 5/2009 | Surtani |
| 2009/0177658 A1 | | 7/2009 | Brantner |
| 2009/0287703 A1 * | | 11/2009 | Furuya .............................. 707/8 |
| 2012/0102006 A1 | | 4/2012 | Larson et al. |

OTHER PUBLICATIONS

DP Reed, Implementing atomic actions on decentralized data, ACM Transactions on Computer Systems (TOCS), 1983.*
Kwok-Wa Lam; Kam-Yiu Lam; Sheung-Lun Hung; Real-time optimistic concurrency control protocol with dynamic adjustment of serialization order, Real-Time Technology and Applications Symposium, 1995.*
MJ Carey, Multiple versions and the performance of optimistic concurrency control, 1983.*
Optimistic concurrency control. (Jan. 27, 2012). In Wikipedia, The Free Encyclopedia. Retrieved 20:59, Mar. 19, 2012, from http://en.wikipedia.org/w/index.php?title=Optimistic_concurrency_control&oldid=473524181.*

(Continued)

*Primary Examiner* — Charles Kim
*Assistant Examiner* — Kurt Mueller

(57) ABSTRACT

The subject disclosure relates to a concurrency control technique that ensures isolation among concurrently execution transactions optimistically in a multiversion database by applying two optional tests at the end of a read-write transaction: validating the visibility of the read set of the read-write transaction(s) and phantom detection by re-scanning and confirming no new version have appeared in the view. Depending on desired level of isolation, both, one or none of the test are applied. Each version of a data record in an applicable database can be assigned two timestamps indicating the lifetime the version. The value of a version timestamp, though assigned, may be conditional on a transaction committing.

22 Claims, 10 Drawing Sheets

OTHER PUBLICATIONS

Carey. M., "Modeling and Evaluation of Database Concurrency Control Algorithms", Ph.D. Thesis, Computer Science Division (EECS). University of California, Berkeley. Aug. 1985.

Casanova. M., "The Concurrency Control Problem for Database Systems", Ph.D. Thesis, Computer Science Department, Harvard University, 1979.

Ries, D.. "The Effects of Concurrency Control on Database Management System Performance", Ph.D. Thesis, Depart. ment of Electrical Engineering and Computer Science, University of California at Berkeley, 19'r9.

Robinson. J.. "Design of Concurrency Controls for Transaction Processing Systems", Ph.D. Thesis. Department of Computer Science. Carnegie-Mellon University. 1982.

A. Adya. Weak Consistency: A Generalized Theory and Optimistic Implementations for Distributed Transactions (PhD thesis). PhD thesis, Laboratory for Computer Science, Massachusetts Institute of Technology, Mar. 1999.

Yang Yang, "The Adaptive Serializable Snapshot Isolation Protocol for Managing Database Transactions", http://ro.uow.edu.au/cgi/viewcontent.cgi?article=1624&context=theses, 2007, 11 pages.

A. Fekete. Serializability and snapshot isolation. In Proceedings of Australian Database Conference, pp. 201-210. Australian Computer Society, Jan. 1999.

J. Gray and A. Reuter. Transaction Processing: Concepts and Techniques. Morgan Kaufmann, 1993.

Oracle® Database Concepts, 10g Release 1 (10.1), Part No. B10743-01, Chapter 13, Dec. 2003.

V. T.-S. Shi and W. Perrizo. A new method for concurrency control in centralized database systems. In R. E. Gantenbein and S. Y. Shin, editors, Computers and Their Applications, pp. 184{187. ISCA, 2002.

Transaction Processing Performance Council. TPC-C Benchmark Specication. http://www.tpc.org/tpcc, 2005.

D. Z. Badal, "Correctness of Concurrency Control and Implications in Distributed Databases", http://ieeexplore.ieee.org/xpl/freeabs_all.jsp?arnumber=762563, 1979, Downloaded on Nov. 10, 2009 at 23:28 from IEEE Xplore, 6 pages.

Rudolf Bayer, et al., "Parallelism and Recovery in Database Systems", TODS 5(2): 139-156(1980), http://wwwbayer.in.tum.de/cgi-webcon/webcon/lehrstuhldb/download/49/application/pdf, Feb. 18, 2003, 4 pages.

Philip A. Bernstein and Nathan Goodman, "Multiversion Concurrency Control Theory and Algorithms", ACM Tranactions on Database Systems, vol. 8, No. 4, Dec. 1983, pp. 465-483, http://www.sai.msu.su/~megera/postgres/gist/papers/concurrency/p465-bernstein.pdf, 19 pages.

R. M. Bryant, "SIMPAS—A Simulation Language Based on PASCAL", Proceedings of the 1980 Winter Simulation Conference T.I. Oren, C.M. Shub, P.F. Roth (eds.), http://portal.acm.org/citation.cfm?id=809389, 16 pages.

Arvola Chan, et al., "The Implementation of an Integrated Concurrency Control and Recovery Scheme", http://portal.acm.org/citation.cfm?id=582353.582386, 1982, 8 pages.

H.T. Kung and John T. Robinson, "On Optimistic Methods for Concurrency Control", http://www.seas.upenn.edu/~zives/cis650/papers/opt-cc.pdf, ACM Transactions on Database Systems, vol. 6, No. 2, Jun. 1981, pp. 213-226, 14 pages.

Daniel R. Ries and Michael Stonebraker, "Effects of Locking Granularity on Database Management System Performance", http://portal.acm.org/citation.cfm?id=320566, ACM Transactions on Database Systems, vol. 2, No. 3, Sep. 1977, pp. 233-246, 14 pages.

Daniel R. Ries and Michael Stonebraker, "Locking Granularity Revisited", http://portal.acm.org/citation.cfm?id=320078, ACM Transactions on Database Systems, vol. 4, No. 2, Jun. 1979, pp. 210-227, 18 pages.

Robert G. Sargent, "Statistical Analysis of Simulation Output Data", http://portal.acm.org/citation.cfm?id=1102769, Simuletter/VIII/3, 12 pages.

Richard E. Stearns and Daniel J. Rosenkrantz, "Distributed Database Concurrency Controls Using Before-Values", http://portal.acm.org/citation.cfm?id=582330, 1981, 10 pages.

Liba Svobodova, "A Reliable Object-Oriented Repository for a Distributed Computer System" http://portal.acm.org/citation.cfm?id=806591, 1981, 12 pages.

Hal Berenson, et al., "A Critique of ANSI SQL Isolation Levels", http://portal.acm.org/citation.cfm?id=223785, 1995, 10 pages.

Arthur J. Bernstein, et al., "Semantic Conditions for Correctness at Different Isolation Levels", http://ieeexplore.ieee.org/xpl/freeabs_all.jsp?arnumber=839387, Downloaded on Nov. 11, 2009 at 00:14 from IEEE Xplore, 10 pages.

K.P. Eswaran, et al., "The Notions of Consistency and Predicate Locks in a Database System", http://research.microsoft.com/en-us/um/people/gray/Papers/On%20the%20Notions%20of%20Consistency%20and%20Predicate%20Locks%20in%20a%20Database%20System%20CACM.pdf, Communications of the ACM, vol. 19, No. 11, Nov. 1976, 9 pages.

Alan Fekete, "Allocating Isolation Levels to Transactions", http://portal.acm.org/citation.cfm?id=1065193, PODS 2005 Jun. 13-15, 2005, Baltimore, Maryland, 10 pages.

Alan Fekete, et al., "Making Snapshot Isolation Serializable", http://portal.acm.org/citation.cfm?id=1071610.1071615, ACM Transactions on Database Systems, vol. 30, No. 2, Jun. 2005, pp. 492-528, 37 pages.

Alan Fekete, et al., "A Read-Only Transaction Anomaly under Snapshot Isolation", http://portal.acm.org/citation.cfm?id=1031570.1031573, SIGMOD Record, vol. 33, No. 3, Sep. 2004, 3 pages.

Thanasis Hadzilacos, et al., "Serialization Graph Algorithms for Multiversion Concurrency Control", http://portal.acm.org/citation.cfm?id=308426, 1988, 7 pages.

Sudhir Jorwekar, et al., "Automating the Detection of Snapshot Isolation Anomalies", http://portal.acm.org/citation.cfm?id=1325995, VLDB '07, Sep. 23-28, 2007, Vienna, Austria, 12 pages.

Michael A. Olson, et al., "Berkeley DB", http://www.usenix.org/events/usenix99/full_papers/olson/olson.pdf, Proceedings of the FREENIX Track: 1999 USENIX Annual Technical Conference, Monterey, California, USA, Jun. 6-11, 1999, 10 pages.

Yoav Raz, "Commitment Ordering Based Distributed Concurrency Control for Bridging Single and Multi Version Resources", http://ieeexplore.ieee.org/xpl/freeabs_all.jsp?arnumber=281924, 1993, 10 pages.

David Gerard Sullivan, "Using Probabilistic Reasoning to Automate Software Tuning", http://www.eecs.harvard.edu/~sullivan/thesis.pdf, Sep. 2003, 227 pages.

M. Alomari, "The cost of serializability on platforms that use snapshot isolation", In ICDE '08: Proceedings of the 24th International Conference on Data Engineering, 2008.

Joe Hellerstein, "Concurrency Control: Locking, Optimistic, Degrees of Consistency", Published Date: 2008, http://www.cs.berkeley.edu/~brewer/cs262/cc.pdf, 6 pages.

"Why Snapshot Isolation is So Useful", Published Date: May 19, 2009, http://iablog.sybase.com/paulley/2009/05/why-snapshot-isolation-is-so-useful/, 5 pages.

Mohammad I Alomari, "Ensuring Serializable Executions with Snapshot Isolation DBMS", Published Date: Dec. 2008, http://ses.library.usyd.edu.au/bitstream/2123/4211/1/Mohammad-Alomari-2009-Thesis.pdf, 171 pages.

Adya, A. et al.; "Efficient Optimistic Concurrency Control Using Loosely Synchronized Clocks"; Proceedings of the ACM SIGMOD International Conference on Management of Data; May 1995; San Jose, CA; 12 pages.

Hillel, A.; "A Transactional Consistency Clock Defined and Optimized"; M.S. Thesis; School of Computer Science, Tel-Aviv University, Israel; May 2009; 58 pages.

Lamport, L.; "Times, Clocks, and the Ordering of Events in a Distributed System"; Communications of the ACM; vol. 21, No. 7; Jul. 1978; pp. 558-565.

Lampson, B. et al.; "A New Presumed Commit Optimization for Two Phase Commit"; Proceedings of the 19th International Conference on Very Large Data Bases; 1993; Morgan Kaufmann Publishers Inc.; San Francisco, CA; pp. 630-640.

Lomet, D. et al.; "Rollback Databases"; Digital Equipment Corporation Cambridge Research Laboratory Technical Report Series; Jan. 10, 1992; 40 pages.

Lomet, D.; "Using Timestamping to Optimize Two Phase Commit"; Proceedings of the Second International Conference on Parallel and Distributed Information Systems; San Diego, Currently Amended; 1993; pp. 48-55.

Wilson, A.; "Distributed Transactions and Two-Phase Commit"; SAP White Paper; 2003; 39 pages.

* cited by examiner

Version of Data Record 400

Begin Timestamp 410

End Timestamp 420

Status 430

Payload data 440

Concurrency Control 450

OPTIMISTIC SERIALIZABLE SNAPSHOT ISOLATION

TECHNICAL FIELD

The subject disclosure relates to concurrency control in database systems and, more specifically, to optimistic concurrency control based on multiversioning and validation.

BACKGROUND

When a database system executes multiple transactions concurrently, the transactions may interfere with each other to produce an incorrect result. To isolate transactions from each other and prevent such interference, database systems implement some form of concurrency control mechanism. There are several different levels of isolation; for instance, the American National Standards Institute (ANSI)/International Standards Organization (ISO) structured query language (SQL) standard defines four isolation levels: serializable, repeatable read, read committed, and read uncommitted. When a set of transactions of a database system run under the highest isolation level, serializable, the database system ensures that the result is the same as would be obtained if the transactions ran serially, one at a time, in some order. As a result, application developers do not need to be concerned that inconsistencies may creep into the database because transactions execute concurrently. Lower isolation levels prevent certain types of interference, but allow other types.

Conventionally, strict two-phase locking (S2PL) and various enhancements such as escrow locking and multigranularity locking have been used for concurrency control. However, S2PL and related techniques have several drawbacks: they can be expensive because of the cost of maintaining extra data structures storing locks and they may cause some transactions to block unnecessarily, thereby reducing the overall throughput of the system. Under high concurrency, the lock manager itself may become a bottleneck that limits the total throughput of the system. The overhead of locking can be a significant factor in main-memory database systems where the cost of accessing records is low.

Snapshot isolation (SI) is an alternative approach to concurrency control that takes advantage of multiple versions of each data item. A transaction T running under SI sees the database state as produced by all the transactions that committed before T started, but no effects are seen from transactions that overlap with T. This means that SI does not suffer from inconsistent reads. Transaction T will successfully commit only if no updates T has made conflict with any concurrent updates made since T's start. In a database management system (DBMS) using SI for concurrency control, read-only transactions are not delayed because of concurrent update transactions' writes, nor do read-only transactions cause delays in update transactions.

However, conventional SI allows some non-serializable executions and does not guarantee serializability. In particular, transactions that produce the correct result when run in isolation may, when run concurrently under SI, produce an incorrect result. The specific anomaly that may occur is known in the literature as "write skew". Depending on the types of transactions that are received by a given database system and the type of application(s) that execute with respect to the given database, upfront management of the problem can be statically implemented to handle the occurrence of such write skews; however, such proactive and proprietary application management is expensive in terms of time, knowhow, additional software coding, and expense introduced by the custom provision of such front end management of transactions.

One recent algorithm for achieving serializable SI concurrency control maintains two Boolean flags in each transaction object indicating, for every transaction T, if there is a read/write (rw)-dependency from a concurrent transaction to T, and if there is an rw-dependency from T to a concurrent transaction. However, a lock manager is required not only to maintain standard WRITE locks, but also to maintain snapshot isolation READ locks, introducing potentially significant overhead that may not be suited for all types of data, applications, and/or databases. The overhead associated with such locking and checking can limit overall throughput in systems with large amounts of data and high concurrency of transactions. Accordingly, more streamlined and flexible implementations for achieving serializable snapshot isolation are desired.

The above-described deficiencies of today's transaction concurrency control techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, snapshot isolation is implemented by tracking a transaction's duration by, e.g., two timestamps: a begin timestamp that is assigned when the transaction begins and an end timestamp that is assigned when the transaction ends. As a multiversioning system, records are not updated in place, rather, update(s) to a record create a new version of the record. A version has a valid time interval, or lifetime. In one non-limiting implementation, each version is assigned two timestamps that specify its lifetime: a version begin timestamp and a version end timestamp.

In this regard, concurrency control as described for various embodiments herein is based on the following observation. A transaction is serializable if its reads and writes logically occur at the same time. However, under snapshot isolation, reads and writes logically occur at different times: reads at the beginning of the transaction and writes at the end of the transaction. Thus, an update transaction is serializable if it can be validated that the transaction would see exactly the same data if all its reads were repeated at the end of the transaction.

In one embodiment, this is implemented by adding a validation phase to update transactions. During normal operations, a transaction records its reads and its scans. During the validation phase, the transaction performs two validation steps: a) the system revisits the versions that the transaction has read and verifies that those versions are still valid as of the end of the transaction and b) the system checks for phantoms by repeating the transaction's scan and verifying that no new versions have appeared in the transaction's view since the beginning of the transaction. If the transaction passes both tests, it is serializable and allowed to commit. Read-only transactions do not require validation.

When a transaction commits, its end timestamp becomes the begin timestamp of new versions it created and the end timestamp of old versions that it replaced. However, the end timestamp of a transaction, and thus the timestamps of its new and old version, become known before it is known whether the transaction will commit or abort. Accordingly, such versions are said to be in doubt.

The method further includes provisions for allowing a transaction to provisionally read or skip an in-doubt version and record a pending commit dependency. In one embodiment, a transaction is not allowed to commit until its pending commit dependencies have been resolved. The method can also include provisions for lazy assignment of timestamps to versions, that is, the timestamps of affected versions are not updated as part of commit processing, but lazily after the transaction has committed.

The method is flexible and can support some or all standard isolation levels (e.g., serializable, repeatable read, read committed, or regular snapshot isolation) by a combination of performing reads at different logical points in time, omitting the phantom check, the read set validation or both.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
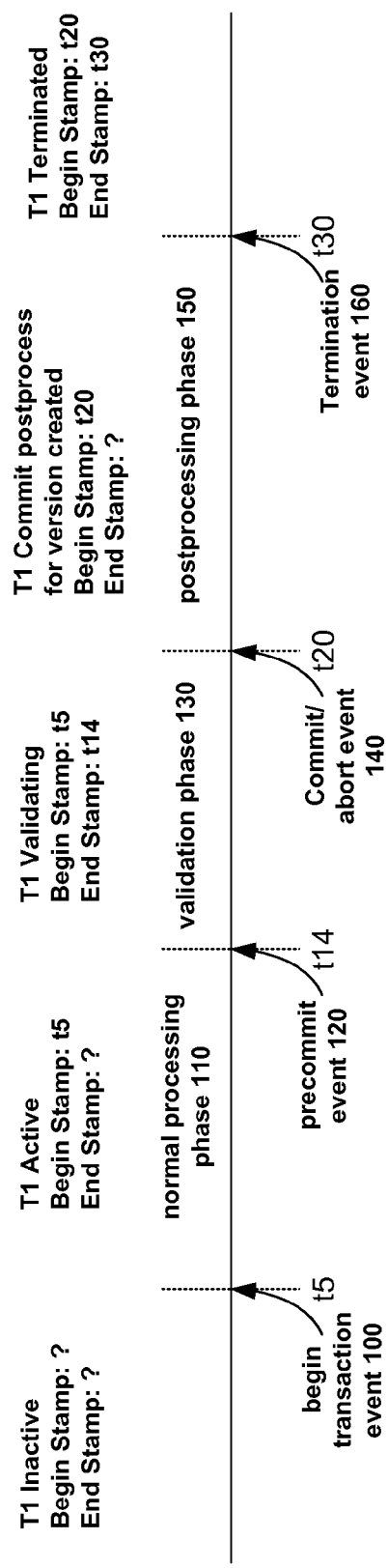
FIG. 1 is an illustrative overview of a lifetime of a transaction.

By way of introduction, database systems either explicitly or implicitly ensure some level of isolation between concurrently executing transactions depending on how the systems are implemented. Most database systems support multiple levels of isolation, e.g., different levels of assurances depending on a given application's requirements, and typically implement isolation by means of locking Conventional locking has the drawback that readers may interfere with writers, however. In particular, long-running read-only transactions may block updates and reduce the throughput of the system. Snapshot isolation (SI) eliminates this problem because reader-only transactions do not interfere with writers.

However, conventional SI does not provide serializable isolation due to the write skew anomaly. By relying on a lock manager and having transactions take out non-blocking locks and checking for rw-dependencies on every read and write, however, one system has made SI serializable. The locks are non-blocking and used only to detect rw-dependencies.

Ensuring serializable execution by implementing an expensive detection of rw-dependencies on every read and write for every transaction as well as taking out locks via a lock manager as described above is not well suited to applications having requirements for low latency or otherwise for high transaction throughput. For instance, an online real-time gaming environment may have requirements that each read and write of a given transaction submitted to the game control component(s) or gaming server(s) must happen very quickly or else, the game suffers from poor responsiveness. On-line financial trading or auction transaction systems may also have low tolerance for high latency where the time of submission becomes sensitive in valuing a given market transaction relative to other market transactions. A financial accounts system that tracks credit card and checking transactions for multiple accounts of millions of users may in turn have high throughput requirements because of the sheer volume of such transactions that happen on an ongoing basis.

In turn, as an example of a transaction system with high volume and low latency requirement, one might imagine a wireless communications network that tracks millions of cell phone locations for purposes of achieving a smooth handoff between one cell phone tower to another cell phone tower as the user is moving, e.g., in a car, or for other reasons. In such system, taking out locks and performing a check if certain characteristics are met in terms of rw transaction dependencies, for every single transaction between every cell phone and every nearby base tower, may be simply unacceptable due to volume and latency expectations.

Thus, less costly, and more efficient and flexible alternative approaches to serializable snapshot isolation are desired. Solutions without the requirement of a lock manager for implementation, though they can nonetheless work in the presence of a lock manager, are desired as well. In consideration of these and other deficiencies of existing concurrency control systems, the subject disclosure presents a variety of embodiments directed to achieving optimistic serializable snapshot isolation among concurrently executing transactions.

In this regard, in various embodiments set forth herein, a transaction T1 running under SI reads a version of the database as it existed at the time T1 began; and subsequent updates by other transactions are invisible to T1. When the transaction starts, it obtains a unique start timestamp from a monotonically increasing counter. When T1 is ready to commit, T1 is assigned a unique commit timestamp from the same counter. Transaction T1 commits only if no other transaction with an overlapping start-commit pair wrote a record that T1 also wrote. Expressed differently, T1 does not commit if it would result in overwriting a version that is invisible to T1.

While the above-described rule(s) ensure correctness, how to resolve write-write (ww) conflicts is also a matter for definition. Different ww-conflict resolution rules result in subtly different versions of snapshot isolation. Suppose two concurrent transactions T1 and T2 include operations to write the same record. This conflict can be resolved in several different ways. Two rules are outlined here, but others are possible, any of which may be selected for purposes of resolving ww conflicts.

Under a "first committer wins" rule, a conflict is not resolved until one of the transactions commits. As an example, suppose T1 commits first. At that point, in an embodiment that selects the "first committer wins" rule, it is known that T2 should abort and either T2 can be aborted immediately or nothing is done allowing T2 to detect the conflict when T2 attempts to commit.

Under a "first writer wins" rule, the transaction that writes the record first wins. As an example, suppose T1 is the first to write a record R. When T2 attempts to write the same record R, it is detected that record R has already been written by T1. T2 then aborts and either T2 can be restarted immediately (eager restart) or T2's restart can be delayed until T1 has committed (lazy restart). In this regard, as described herein, any of the rules for resolving ww conflicts can be employed.

Any implementation of SI also ensures that a transaction T1 reads the correct version of a record. In one aspect of the various embodiments described herein, each version of a record contains two timestamps that specify the start and end of the valid time of the version. Under SI, a version is visible to a transaction if the transaction's start time falls within the valid time of the version. By using two timestamps, visibility of a version can be determined in isolation, that is, without accessing other versions of the record.

In this regard, the various embodiments described herein introduce alternative approaches to concurrency control that have several benefits: a) a lock manager is not required, though one may be accommodated, b) all traditional levels of isolation (serializable, repeatable read, read committed, SI, and dirty read) are supported, and c) the method is fair in the sense that transactions requesting a high isolation level bear the full overhead of enforcing the higher isolation level.

With respect to support of other levels of isolation, there are a variety of different levels of assurances for reading activity with respect to data transactions including dirty read (DR), read committed (RC), Repeatable Read (RR) and serializable (S) that may or may not be desirable depending on the particular application being served for the data.

Under DR isolation level, a transaction T1 always reads the latest version of a record regardless of whether the version is committed or not. If T1 reads a version created by a transaction T2 that subsequently aborts, then T1 has seen data that logically never existed. However, for some reporting or monitoring applications covering large amounts of data and where the exact values are not quite as important as the global trends in the data, the small error introduced by such reads may be acceptable.

Under RC isolation level, a transaction T1 reads the latest committed version while uncommitted versions are ignored. This has the effect that T1 may see some of the updates from a transaction T2 that committed during T1's lifetime, but also miss some of T2's updates. In other words, T1 does not have a transaction-consistent view of the data.

Under RR isolation level, the system guarantees that a transaction T1 is allowed to commit only if all versions that T1 read are still valid as of the end of the transaction. This can be ensured by validating T1's read set at the end of the transaction.

Serializable (SR) isolation can be viewed as a form of repeatable read that further handles the problem of phantoms. The problem of phantoms is illustrated by the execution of a read operation of a transaction T1 when another transaction T2 may introduce and commit versions that fulfill the selection criteria of the read operation. At the end of T1, such versions are visible to T1 but, depending on the timing of the read operation, may not have been read during normal processing. Thus, data that was not present upon the start of the transaction may appear during the transaction, and thus the term "phantom" is used to imply its appearance "out of the blue". Accordingly, not only will SR guarantee that the items read during a transaction do not change by the end of the transaction but SR additionally guarantees that no new data within scope of the transactions reads are introduced until after the transaction concludes.

Snapshot isolation (SI), as described elsewhere herein, is still another form of isolation. Under SI, a transaction logically obtains its own snapshot of the data at transaction start time, which guarantees that read operations do not block and that the transaction has a consistent view of the data. Write operations logically occur at the end of the transaction.

In one aspect of embodiments described herein, the algorithms for providing serializable SI support any of the above levels of isolation by foregoing one or more algorithmic steps (e.g., read set validation or phantom check described in more detail below) where fewer assurances are required.

In one embodiment, a snapshot isolation system includes a concurrency control component that verifies for a read-write transaction that all its read operations would yield the same result if the reads were performed at the end of the transaction.

Each version of a data record in an applicable database can be assigned two timestamps that specify the valid time interval, also called the lifetime, of the version. The two timestamps include a begin timestamp and an end timestamp. The begin timestamp may be provisional and depend on the transaction creating the version committing. Similarly, the end timestamp may also be provisional and depend on the transaction that created a replacement version committing. The concurrency control component determines whether a version is visible to a transaction based on the two timestamps.

The concurrency control component detects phantoms of the transactions by scanning at least some of the data records.

The concurrency control component also stores the read set of a read-write transaction and validates the read set at commit time. A write set can also be maintained by the concurrency control component. The concurrency control component may be configured to provide any one of the following isolation levels: read committed, repeatable, serializable, or snapshot isolation independently for each transaction.

In one embodiment, an optimistic multiversion concurrency control system includes a concurrency control component configured to enforce isolation among concurrently executing transactions operating on data in one or more data stores by verifying, with respect to read-write transaction(s) that perform at least one read operation and at least one write operation, that all data reads of the read-write transaction(s) yield the same result if the data reads were to be repeated at the end time of the at least one read-write transaction, wherein write operations create a new version of a data record of the one or more data stores, and each version of a data record is assigned at least two timestamps specifying the lifetime of the version.

The two timestamps can include a begin time for the lifetime of the version, which can be conditional upon a current transaction committing or aborting. The two timestamps can include an end time for the lifetime of the version, which can be conditional upon a dependent transaction committing or aborting.

The concurrency control component is configured to verify a same result of data reads, if performed at the end time of the transaction as during processing the transaction, based on the at least two timestamps. The concurrency control component is configured to store a read set of a transaction during processing of the transaction and to validate a read set of the transaction of the at least one read-write transaction at commit time of the transaction where an isolation level of the transaction indicates that read set validation is to be performed.

Also, where the isolation level the transaction indicates a phantom check is to be performed, the concurrency control component is configured to detect phantoms by scanning at least some of the data records. The concurrency control component is also configured to store a write set of a current transaction during processing of the current transaction.

As alluded to above, the concurrency control component can thus be configured to provide at least one of read committed level of isolation, repeatable read level of isolation, or serializable level of isolation independently for given transactions of the read-write transaction(s).

In another embodiment, a method for providing concurrency control among a set of concurrently executing transactions, comprises identifying an isolation level associated with a transaction of the set that updates data record(s) stored in at least one database to generate new version(s) for the data record(s). Depending on the isolation level associated with the transaction, the method can include storing read set information associated with processing the transaction including storing references to versions of data records that were read by read operations of the transaction and further include validating, based on at least the read set information, that the versions of the data records remain visible as of an end time of the transaction.

In one embodiment, if a serializable requirement is associated with the transaction, the method performs the storing and the validating, if a repeatable read requirement is associated with the transaction, the method also performs the storing and the validating; however, if a read committed requirement is associated with the transaction, the method omits performing the storing and the validating.

In another embodiment, a method for providing concurrency control among a set of concurrently executing transactions, comprises identifying an isolation level associated with a transaction of the set that updates data record(s) stored in at least one database to generate new version(s) for the data record(s). Depending on the isolation level associated with the transaction, the method can include storing scan set information associated with processing the transaction including information that enables a repeat of scan operations performed by the transaction and further include verifying that the scan operations performed during the processing of the transaction yield a same result if the scan operations were performed as of an end time of the transaction.

The verifying can include verifying that scans of at least part of an ordered index implicated by the scan operations yield the same result if the scan operations were performed as of the end time of the transaction and/or verifying that scans of at least one hash table implicated by the scan operations yield the same result if the scan operations were performed as of the end time of the transaction.

In an embodiment, if a serializable requirement is associated with the transaction, the method performs the storing and the verifying of scans, however, if a repeatable read or read committed requirement is associated with the transaction, the method omits performing the storing and the verifying of scans.

Herein, an overview of some of the embodiments for achieving optimistic serializable snapshot isolation has been presented above. As a roadmap for what follows next, various exemplary, non-limiting embodiments and features for optimistic serializable snapshot isolation are described in more detail. Then, some non-limiting implementations and examples are given for additional illustration, followed by representative network and computing environments in which such embodiments and/or features can be implemented.

Optimistic Serializable Snapshot Isolation

By way of further introduction, a transaction is serializable if the reads and writes of the transaction logically occur at the same time, i.e., occur atomically. However, under snapshot isolation, reads and writes logically occur at different times: with reads logically occurring at the beginning of the transaction and writes at the end of the transaction. Accordingly, by definition, a read-write transaction running under snapshot isolation is serializable if it can be verified that exactly the same data will be read if all of the reads of the transaction were instead done at the end of the transaction.

To ensure this, various embodiments herein can implement one or more of the following depending on the level of isolation assurance that is desired for a given transaction: (1) validate the read set or (2) detect phantoms.

To enable validation of the read set, the read set of the transaction is tracked during normal processing, that is, which record versions were read. Then, at commit time, the versions in the read set are revisited to verify that the versions read earlier remain visible as of the end of the transaction. That is, validating the read set checks that nothing has disappeared from view since the records were initially read.

To detect phantoms, the goal is to verify that each scan performed during normal processing would not return any new versions if the scan were repeated at the end of the transaction, that is, to verify that nothing has been added to the view. Scans can include not only scans of part of an ordered index but also scans of hash table buckets.

In this regard, supporting both the above-mentioned validating of the read set and detecting of phantoms achieves serializability for snapshot isolation, and without the need for a lock manager. Beneficially, this approach can be extended to support all isolation levels, not just serializable isolation, specified for structured query language (SQL) data stores. For instance, to support repeatable read isolation, the check for phantoms can be omitted. In addition, to achieve read committed guarantees, both validation steps (read set validation and phantom check) can be omitted and all read operations are set to reading the latest committed version. For regular snapshot isolation, by definition of a snapshot isolation system, both validation steps can be omitted.

For additional context illustrative of one or more non-limiting ways to implement the above validation steps, the life of a transaction can be described as follows. In this regard, a read-write transaction undergoes three different phases bracketed by four events, illustrated generally by FIG. 1. In accordance with various embodiments described herein, each version contains a start timestamp and an end timestamp, which together indicate its valid time.

With a begin transaction event 100, the transaction object is created. The transaction's start timestamp is acquired (e.g., at time=t5 in FIG. 1) and the transaction state is set to active. Transaction T1 has entered its normal processing phase 110 where it performs its normal processing with all its reads performed as of the beginning of the transaction. In one aspect of the various embodiments described herein, the transaction's read set, write set and scan set are recorded. In one non-limiting implementation, write-write conflicts are resolved by the first-writer-wins rule and the transaction may abort for a variety of reasons.

When T1 has completed its normal processing, it requests to commit. This triggers a precommit event 120, at which time transaction T1 acquires its end timestamp (e.g., time=t14 in FIG. 1) and switches to validating state. In validation phase 130, the reads of transaction T1 are validated, that is, a check is performed whether the transaction would see exactly the same versions if all of its reads were instead performed as of the end timestamp. Multiple transactions can perform validation concurrently and a transaction can use multiple threads for its validation. If validation succeeds, copies of all versions created by transaction T1 and a commit record can be written to a persistent redo log.

Next, a commit or abort event 140 occurs. Based on the outcome of the validation phase, the transaction is switched to Committed or Aborted state depending on whether the transaction T1 could be committed based on the evaluation of the validation or should be aborted for any one of a variety of reasons that may not result in sufficient assurance of isolation for the given transaction to carry itself forward.

Once aborted or committed, the transaction enters post-processing phase 150. If the transaction committed, its write set is "fixed up" in the post-processing phase as follows. In versions created by the transaction, the start timestamp is set to the commit timestamp of the transaction (e.g., as shown in FIG. 1). In versions replaced by the transaction, the end timestamp is set to the commit timestamp of the transaction. If the transaction aborted, all versions it created are declared garbage. Multiple transactions can perform postprocessing concurrently and a transaction can use multiple threads for postprocessing. Upon a termination event 160, the transaction state is marked as terminated and possibly moved to a list of terminated transactions.

It is noted that a read-only transaction has no need to validate its read set, so a read-only transaction can skip the validation phase, commit immediately and can also skip the postprocessing phase. Furthermore, if it is known beforehand that a transaction is read-only, there is no need to record its read set and scan set.

Described below in more detail are concurrency control algorithms, and associated components for implementing the algorithms, that employ a version's valid time, its visibility by transactions in the system and conflict resolution for identified conflicting transactions.

In this regard, versions are given a valid time interval, spanning the beginning of valid time to the end of the valid time. The beginning of the valid time of a version equals the commit timestamp of the transaction that created the version and the end of the interval equals the commit timestamp of the transaction that replaced the version with a newer version. While commit timestamps of a transaction are assigned at precommit, they remain in doubt until the transaction has completed its validation phase. In this section, various examples are presented that illustrate how this uncertainty can affect reads, validation and writes.

Figure 2:
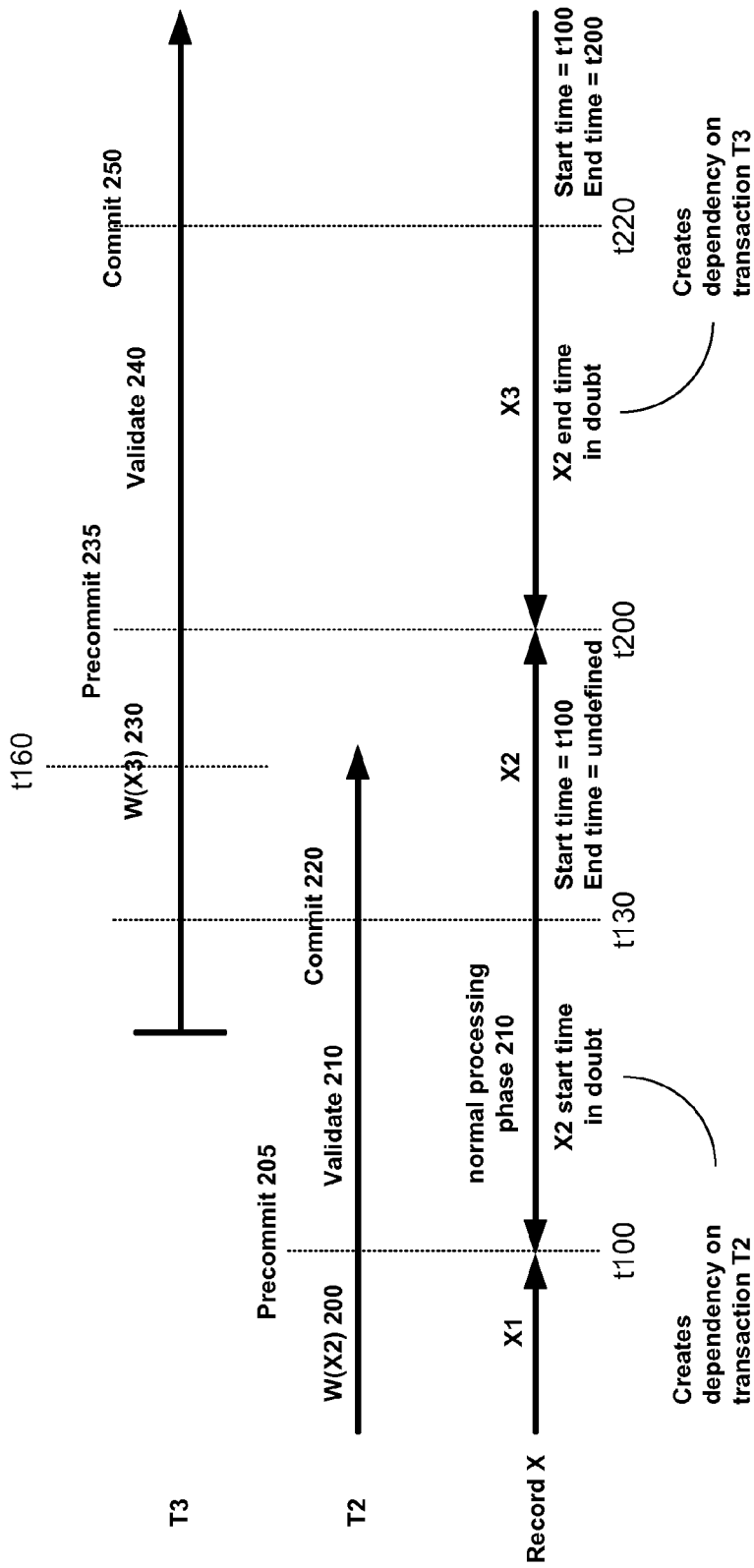
FIG. 2 is an illustrative view of the lifetime of multiple transactions showing periods of time in which a start time or an end time of a version is in doubt.

In accordance with one or more embodiments, a valid time of a version is described with at least two timestamps. For instance, FIG. 2 illustrates the valid time of a version X2 of a record X as it progresses from a version X1 to X2 and then to X3. Transaction T2 updates a record X at step 200 creating a new version X2 sometime before time=t100. At this point, the new version X2 is only visible to T2. T2 then precommits 205, receives the end timestamp time=t100, and begins its validation phase 210. In this and other embodiments herein, a timestamp is not restricted to an actual time. Counters or a tick-count can also be used to represent timestamps, e.g., any data that represents progression.

T2's precommit establishes the start timestamp of X2 (and the end timestamp of the previous version X1) as time=t100. X2 is the latest version so its end time stamp is assigned infinity at that point, or other undefined data. However, the start timestamp is in doubt until T2 completes its validation phase 210 at time=t130 and commits 220. At that point, X2's start timestamp becomes firm and the new version becomes stable (committed).

A transaction T3 then updates record X at time=t160 creating a version X3, precommits 235 and undergoes validation phase 240 and commits at 250 when time=t220. At precommit T3 received the commit timestamp time=t200. Time=t200 then becomes the end timestamp of version X2, but the end timestamp of version X2 remains in doubt until T3 completes its validation phase 210 at time=t220. At that point, X2's valid time of time=t100 to time=t200 becomes final and does not change further.

It is noted in this example that T3 started after time=t100. If it had started before time=t100, it would have seen version X1 and when attempting to update X1, the timestamp information would indicate that X1 is not the latest version. Following the first-writer-wins rule, T3 would then have aborted.

In summary of this example, between time=t100 and time=t200, X2's valid time is (t100, ∞), but the start timestamp is in doubt until time=t130. From time=t200 on, the valid time is (time=t100, time=t200) but the end timestamp is in doubt until time=t220. Accordingly, after receiving a start timestamp, a period of doubt ensues for the version, pending validation of the start timestamp, before the start timestamp can be trusted without doubt. Similarly, after receiving an end timestamp, a period of doubt ensues for the version, pending validation of the start timestamp, before the end timestamp can be trusted without doubt.

With respect to visibility and conflict resolution, with further reference to FIG. 2, let Tx be a transaction that starts after time=t100 but before time=t200. Then, Tx should see version X2—and no other versions—when it attempts to access record X. Whether a version is visible to a transaction depends on the transaction's start time and the valid time of the version but, as shown in FIG. 2, a version's valid time is sometimes in doubt. If Tx accesses a version during that time, it may not be able to conclusively determine whether the version is visible to it.

With respect to reads, if transaction Tx started between time=t100 and time=t200, logically, the reads of Tx occur at its start time, and thus Tx should see X2, though exactly what happens depends on the actual read time as follows.

In case the actual read time is between time=t100 and time=t130, X2's start timestamp is in doubt and thus it is not clear whether Tx should see X2 or not. Tx then has three choices:
  1. Abort immediately.
  2. Wait until T2 commits or aborts.
  3. Take out a commit dependency on T2 and continue processing.

While any of the choices can be selected, in one embodiment, the third option is selected because, even though it is speculative, the work is unlikely to be wasted most of the time for most transaction sets.

In case the actual read time is after time=t130, during this time, X2 is a stable version and X2 is visible to Tx. This is true even during the interval time=t200 to time=t220 when X2's end timestamp is in doubt because Tx's start time falls within the valid time of X2, regardless of whether T3 commits or aborts.

With respect to the validation phases, at some point, Tx precommits, receives an end timestamp, and begins validation. Whether or not validation of the read of X2 succeeds depends on whether Tx's end timestamp falls within X2's valid time interval or not. In other words, if Tx's end time is between time=t100 and time=t200 in this example of FIG. 2, validation of X2 succeeds, otherwise, it fails. However, at the time the validation is performed, as noted, the start timestamp, the end timestamp or both may still be in doubt.

In this regard, it is noted that the end timestamp of a transaction is always less than a time when validation is performed.

As a first case, Tx's end time is before time=t200 is considered. For actual validation time between time=t100 and time=t130, this can occur if Tx took a commit dependency on T2 when it read X2. X2's start timestamp is still in doubt so Tx has the same three choices as above.
1. Abort immediately.
2. Wait until T2 commits or aborts.
3. Take out a commit dependency on T2 and continue validation. In fact, Tx already has a commit dependency by definition, and thus no need to take it again.

In one embodiment, the third option is chosen for the concurrency control algorithms.

Where actual validation time is after time=t130, X2 is stable with an end timestamp of infinity (or other undefined representation) so validation succeeds.

In this respect, the analysis and choices are the same for reads and validation, since validation represents a re-checking of a previously read version, but using the transaction's end timestamp instead of its start timestamp.

As a second case, Tx's end time being after time=t200 is considered. For an actual validation time between time=t200 and time=t220, X2's end timestamp is in doubt and validation should succeed only in the unlikely event that T2 aborts. Tx has three choices.
1. Abort immediately.
2. Wait until T3 commits or aborts.
3. Take out an abort dependency on T3 and proceed with validation.

Option 1 is the choice made in one embodiment because T2 is likely to commit.

If the actual validation time is after time=t220, X2's end timestamp is now stable. Tx finds that X2 is no longer visible to it so validation fails and Tx aborts.

Having described processes for reads, now some processes for writes are described. In this regard, to retain a linear sequence of versions, a writer is only allowed to update the latest version of a record. As mentioned, in one embodiment, write-write conflicts are resolved according to the first-writer-wins rule, that is, the first transaction that attempts to update a version proceeds and later transactions attempting to update the same version abort.

For instance, let Tx be a transaction that started after time=t100 and attempts to update version X2. The outcome depends on when Tx attempts the write.

If Tx's write occurs between time=t100 and time=t130, X2 is the latest version, but it is still in doubt because T2 has not yet committed. Tx thus again has three choices.
1. Abort immediately.
2. Wait for T2 to commit.
3. Take out a commit dependency on T2 and proceed with the update.

In one embodiment, option 3 is chosen for Tx because T2 is likely to commit and the speculative work is unlikely to be wasted.

If Tx's write occurs between time=t130 and time=t160, X2 is the latest version, it is stable and it has no pending updates, so Tx proceeds with the update.

If Tx's write occurs between time=t160 and time=t220, X2 is the latest stable version, but X2 has a pending update on it resulting from T3's write at time=t160. Again Tx has three choices.
1. Abort immediately.
2. Wait for T3 to abort.
3. Take out an abort dependency on T3.

Option 2 is the first-writer-wins rule and the choice made for the concurrency control algorithms of an embodiment.

If Tx's write occurs after time=t220, this does not happen because X2 is no longer the latest version so X2 is not updatable.

With respect to data structures, it can be appreciated that the above described techniques and processes can be implemented with a great variety of data structures for representing the concepts embodied the various techniques.

The following description summarizes some of the objects that can be used to represent transactions and record versions, however, these objects are to be taken as non-limiting. In one embodiment, the objects are simple by design, containing only the fields for supporting serializable snapshot isolation. Other fields may of course be added as required for other purposes.

Some system-wide objects that can be maintained include a transaction event counter, a monotonically increasing counter used as a source for timestamps, e.g., a logical clock. The function NextSequenceNumber( ) atomically returns the counter's current value and increases it by one.

A transaction table can be maintained as a hash table for transaction objects with transaction id (=transaction start timestamp) as the key. A transaction object remains in the transaction table until it has completed postprocessing and terminated.

A transaction morgue can contain read-write transactions that have terminated but whose write sets are still needed for garbage collection. The transaction morgue can be organized efficiently as a doubly-linked list sorted on transaction end timestamp.

A transaction table method can include get transaction pointer that takes a transaction identifier and returns a stable pointer to a transaction object or null.

Transaction objects can include a transaction start timestamp, which can also be used as a transaction identifier (ID) and a transaction end timestamp, which can be set initially to a max timestamp and set during precommit or abort events. In addition, transaction state is tracked as Active, Validating, Committed, Aborted. The possible state transitions are:
Active ⇒ Validating on precommit,
Active ⇒ Aborted on exception during normal processing,
Validating ⇒ {Commited, Aborted} at end of validation phase.

TxTerminated is a transaction object Boolean flag set to true when a committed or aborted transaction has completed its postprocessing phase, described in more detail below.

Another transaction object is a transaction read set, which contains a set of pointers to versions read by this transaction and is used for validating the transaction's reads during the validation phase. Yet another transaction object that can be maintained is the transaction scan set, which contains an entry for each hash chain scanned by the transaction and is used for detecting phantoms. In one embodiment, entries contain the following fields:

| | |
|---|---|
| ChainPtr | Pointer to the head of the hash chain scanned. |
| SearchPred | Stores information about the search predicate used for the scan. Implementation dependent, but contains enough information to allow the predicate to be evaluated with the same parameter values as during the scan. |

Yet another transaction object is the transaction write set, which contains a set of entries storing two pointers: NewVersionPtr and OldVersionPtr. The NewVersionPtr points to the new versions created by this transaction and OldVersionPtr points to the prior version of the record. OldVersionPtr is null for inserts and NewVersion is null for deletes. These pointers can be used for at least four purposes: a) finalizing the start timestamp of new versions and the end timestamp of old versions during postprocessing, b) writing to the persistent redo log during commit processing, c) for transaction undo after an abort and d) garbage collecting old versions that are no longer needed.

Other transaction objects that may be useful include a transaction commit dependency count, which is the number of commit dependencies the associated transaction still has pending. The transaction cannot commit until this counter is down to zero. Another is the transaction dependency failed Boolean flag, initially set to false. When set to true, this transaction must abort because one of the transactions on which it has a commit dependency has aborted.

The transaction commit dependencies outstanding is a set that stores pointers to the transactions on which the given transaction has an outstanding commit dependency. In one embodiment, this is organized as a compact hash table because it is used to check for duplicates to avoid taking out a dependency on the same transaction multiple times.

The transaction commit dependency incoming is a set that keeps track of incoming commit dependencies and contains IDs of transactions that have taken out a commit dependency on this transaction and need to be informed when this transaction commits or aborts. This transaction object can include the following fields.

| | |
|---|---|
| TxIdArray | A small fixed-size array storing transaction ids. |
| ArraySize | Number of slots in TxIdArray. |
| Count | Number of occupied slots in TxIdArray. |
| Closed | Set to true when no further commit dependencies are accepted because the transaction has committed or aborted. |

The information in SearchPred allows the correct search predicate to be applied on potential phantoms during validation. What is exactly stored depends on how evaluation of search predicates is implemented. For example, if search predicates are implemented by dynamically generated code, the information would include a pointer to the predicate function and the parameter values to pass to the function.

The implementation of the transaction write set can be optimized to reduce space requirements. The transaction write set needs to distinguish between a pointer to a new version and a pointer to an old version. For instance, this can be done by hijacking one unused bit of a pointer value to use as a marker. If so, inserts and deletes generate only one pointer while updates generate two. However, in one embodiment, identifying deletes during redo logging is made easier if two bits are used encoding four types: Insert-New, Update-New, Update-Old, and Delete-Old.

Commit dependencies can be handled in the following way. A transaction T1, which takes a commit dependency on a transaction T2, registers its commit dependency with T1 by adding its transaction ID to T2's list of incoming dependencies. T1 also increments its counter of outstanding dependencies. When T2 commits, it finds T1 in its list of incoming dependencies and informs T1 of the commit by decrementing T1's transaction commit dependency count. When T1's transaction commit dependency count becomes zero, T1 can commit. If T2 aborts, it sets T1 dependencies failed Boolean parameter to true, which signals to T1 that it must abort.

Having described some exemplary, non-limiting transaction objects, some exemplary record (version) objects are described as well. For instance, a record object VersionStartTs can indicate the start of this version's valid time and contain the transaction id (start timestamp) or the end timestamp of the transaction T1 that created this version. For some non-limiting details, the sign bit can be used to indicate the type: if the sign bit is set, the field contains T1's transaction id, otherwise T1's end timestamp. When the version is created the field contains a transaction id and the sign bit is set. To determine the status of the version, the transaction object is looked up and its state is used. The field is finalized after T1 commits, that is, changed to the end timestamp of T1 and after clearing of the sign bit during T1's postprocessing phase. If T1 aborts, the field is not modified during postprocessing.

Another record object VersionEndTs can indicate the end of this version's valid time and contains the transaction id (start timestamp) or the end timestamp of the transaction T2 that replaced this version with a new one. Again, the sign bit can be used to indicate the type: if the sign bit is set, the field contains T2's transaction id, otherwise T2's end timestamp. The VersionEndTs can be initially set to the maximum timestamp value and goes through the same transition as VersionStartTs but all changes are made by T2. If T2 aborts, the field is reset to the maximum timestamp.

An IsGarbage flag indicates whether the version to which it applies is garbage left by a transaction T1 that aborted and can be initially set to false, and set to true during postprocessing of T1 if applicable.

Three functions can be provided for testing and manipulating VersionStartTs and VersionEndTs fields: IsTxId is a function that returns true if the sign bit of the value is set indicating that the field contains a transaction id, ToTs is a function that can be used to convert the input value to a timestamp by setting the sign bit to zero and ToTxId is a function that can be used to convert an input value to a transaction id by setting the sign bit to one.

In one embodiment, the record versions are assumed to remain in memory and are not moved, that is, once a record version has been created, it stays in the same location in memory until it is discarded.

A transaction may update the same record multiple times. For simplicity, a new version is assumed to be created each time. For instance, this can simplify index updates: the new version simply is inserted into all indices on the table. If same-transaction updates were made in place, which indices are affected would be determined, the prior version deleted from some indices, and the new version inserted into some indices. While this optimization is not described in great length here, it may also be included, where desirable.

Accordingly, for simplicity of conceptual representation though not for limitation, an embodiment considers fixed-size hash indices, though again it is noted that other data structures, such as trees or skip lists, enabling ordered scans can be used.

In an aspect of various embodiments set forth herein, no deadlocks result. A transaction may have to wait for another transaction to complete its validation before it can commit. Waiting can potentially lead to deadlocks, however, this cannot happen with the embodiments presented herein.

Let T1 be a transaction that is waiting for a transaction T2 to complete its validation phase. T1 is also in its validation phase. Then both T1 and T2 have precommitted and received their end timestamps, T1.TxEndTs and T2.TxEndTs. Then, because T1 is waiting on T1 it must be younger than T2, that is, T2.TxEndTs<T1.RxEndTs. This means that T2 cannot be waiting on T1 because an older transaction never waits on a younger transaction—its updates are not visible to the older transaction. In other words, T1 and T2 cannot be deadlocked. The same argument extends to multiple transactions. In a wait-for graph, with these embodiments, the direction of edges are from a younger transaction to an older transaction, so cycles do not occur.

With respect to garbage collection, mentioned above, a version is no longer needed and can be garbage collected when its valid time no longer overlaps with the lifetime of any active transaction. In this context, a transaction is considered active until it has completed all its postprocessing and its state is changed to Terminated.

Garbage collection can be handled by a dedicated garbage collection thread that wakes up according to some policy, for example, at regular intervals or when the number of terminated transactions exceeds some threshold. The thread determines which transactions' garbage can be collected; the actual garbage collection can then be handed off to a number of concurrent worker threads.

Before deleting a version, the version is first unhooked from all the indices in which it participates. After that, it can be physically deleted, but this has to be done carefully because scans may still have pointers to it. As mentioned earlier, this issue can be handled by known techniques (reference counting or hazard pointers).

Transactions can be moved from TxTable to another table TxMorgue when they terminate. What information needs to be retained depends on whether the transaction committed or aborted. If the transaction aborted, its new versions are garbage so TxWriteSet.NewVersionPtr is retained. If the transaction committed, its old versions will eventually become garbage so TxWriteSet.OldversionPtr is retained. The other sets in the transaction object are not needed for garbage collection.

If T1 aborted, versions referenced by a transaction T1 in TxTerminated can be discarded at any time because they are marked as garbage and invisible to all transactions. If T1 committed, the end time of all its old versions equals T1's commit timestamp. Hence, as soon as the start timestamp of every transaction in TxTable is greater than T1.TxEndTs, T1's old versions are no longer visible to any transaction and can be discarded.

Thus, in this non-limiting implementation, determining what versions can be garbage collected boils down to a) finding the oldest transaction (min start timestamp) in TxTable and b) locating all transactions in TxMorgue with an end timestamp less than the min start timestamp. As usual, this can be implemented in several ways, for example, by scanning or by using priority queues.

Figure 3:
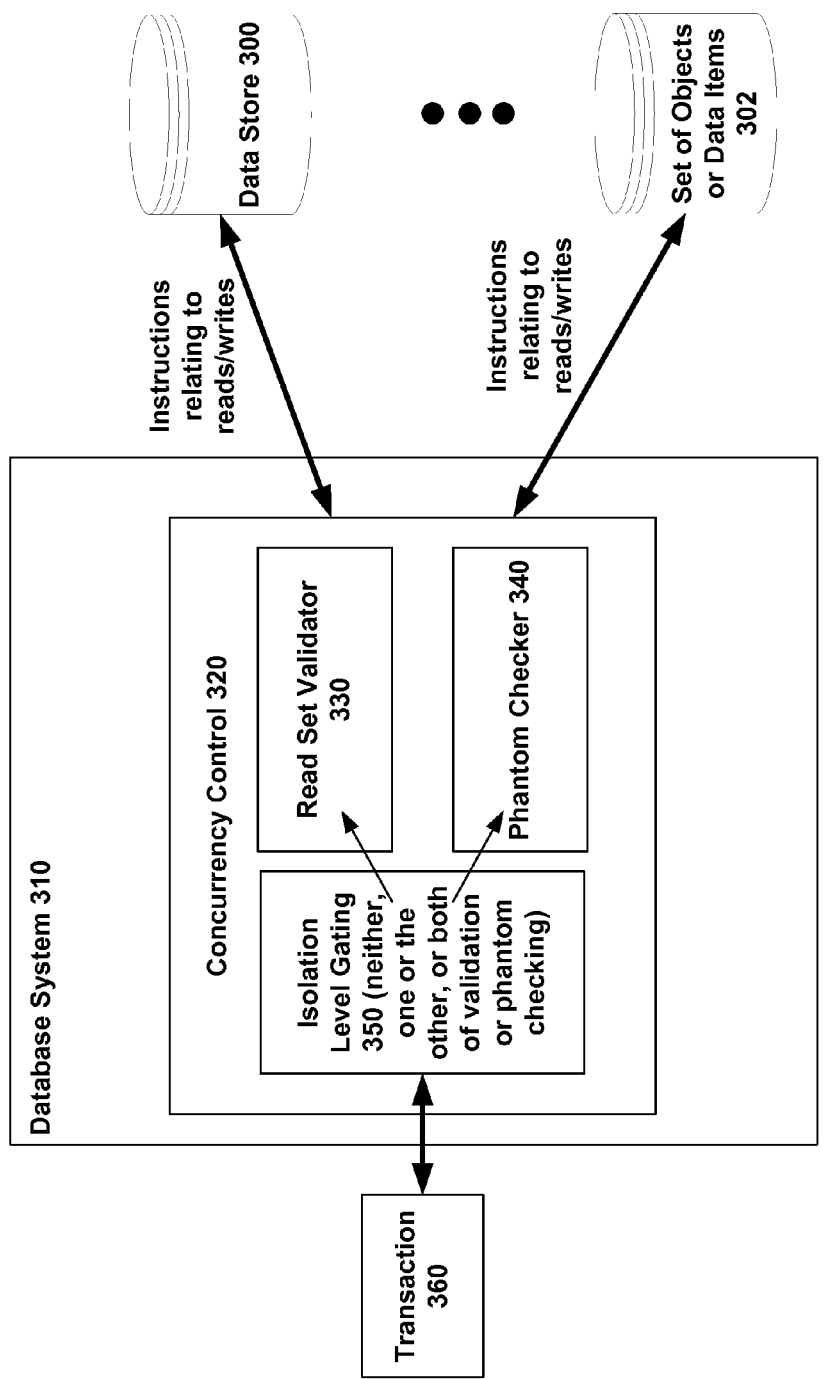
FIG. 3 is a block diagram showing a snapshot isolation system implementing a concurrency control mechanism in accordance with one or more embodiments.

Illustrating one or more of the above aspects, FIG. 3 is a block diagram showing a database system 310 containing a concurrency control component 310 that implements a concurrency control algorithm that enforces isolation among concurrently executing transactions as follows.

For a current transaction 360 being processed by the system 310, concurrency control component 320 identifies an isolation level associated with the transaction 360 and based on a gating component 350 that takes the isolation level into account, either, neither or both of components 330 and 340 for read set validation and phantom checking, respectively, are invoked for transaction 360 as described for various embodiments herein. It can be appreciated such components 330, 340, 350 can be combined or further subdivided. In this regard, different transactions can be associated with different isolation requirements for flexibility in balancing integrity versus processing cost, e.g., lower levels of isolation such as read committed may require neither read set validation 330 nor phantom check 340 whereas a high level of isolation such as serializable may dictate that the transaction 360 undergo both read set validation 330 and phantom check 340.

Figure 4:
FIG. 4 is a block diagram showing exemplary information included or associated with a version of a data record in accordance with a two timestamp embodiment.

FIG. 4 is a block diagram showing exemplary information included or associated with a version of a data record in accordance with a two timestamp embodiment, though any information indicating the lifetime of a version can be used. As shown in this embodiment, in addition to its payload data 440, a version of a data record 400 can include or is otherwise associated with a begin timestamp 410, an end timestamp 420 and a status field 430, which can be used by the concurrency control mechanism 450 to analyze and assign timestamps and transactional dependencies, as described, for instance, in connection with FIG. 2 above.

Figure 5:
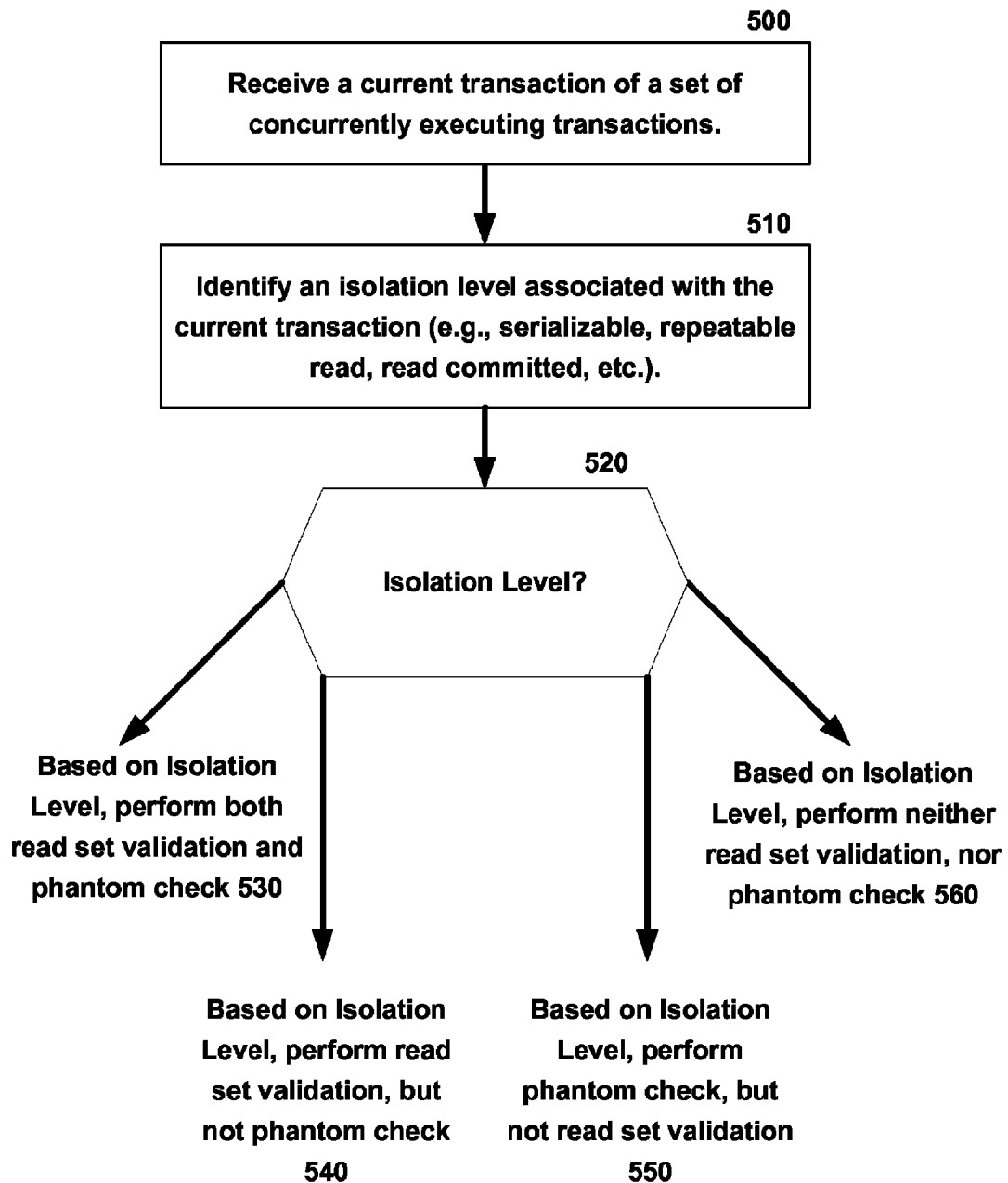
FIG. 5 is a flow diagram illustrating an exemplary non-limiting process for performing read set validation for data transactions in a snapshot isolation system.

FIG. 5 is a flow diagram illustrating an approach in which neither, either or both of read set validation or phantom checking are performed based on an isolation level identified for a currently processed transaction. At 500, a current transaction of a set of concurrently executing transactions is received. At 510, an isolation level associated with the current transaction is identified (e.g., serializable, repeatable read, read committed, etc.). At 520, depending on the isolation level identified, it is determined whether neither, either or both of read set validation or phantom checking are to be performed. At 530, based on isolation level, both read set validation and phantom check are performed. At 540, based on isolation level, read set validation is performed, but phantom check is not performed. At 550, based on isolation level, phantom check is performed, but read set validation is not performed. At 560, based on isolation level, neither read set validation, nor phantom check are performed.

Figure 6:
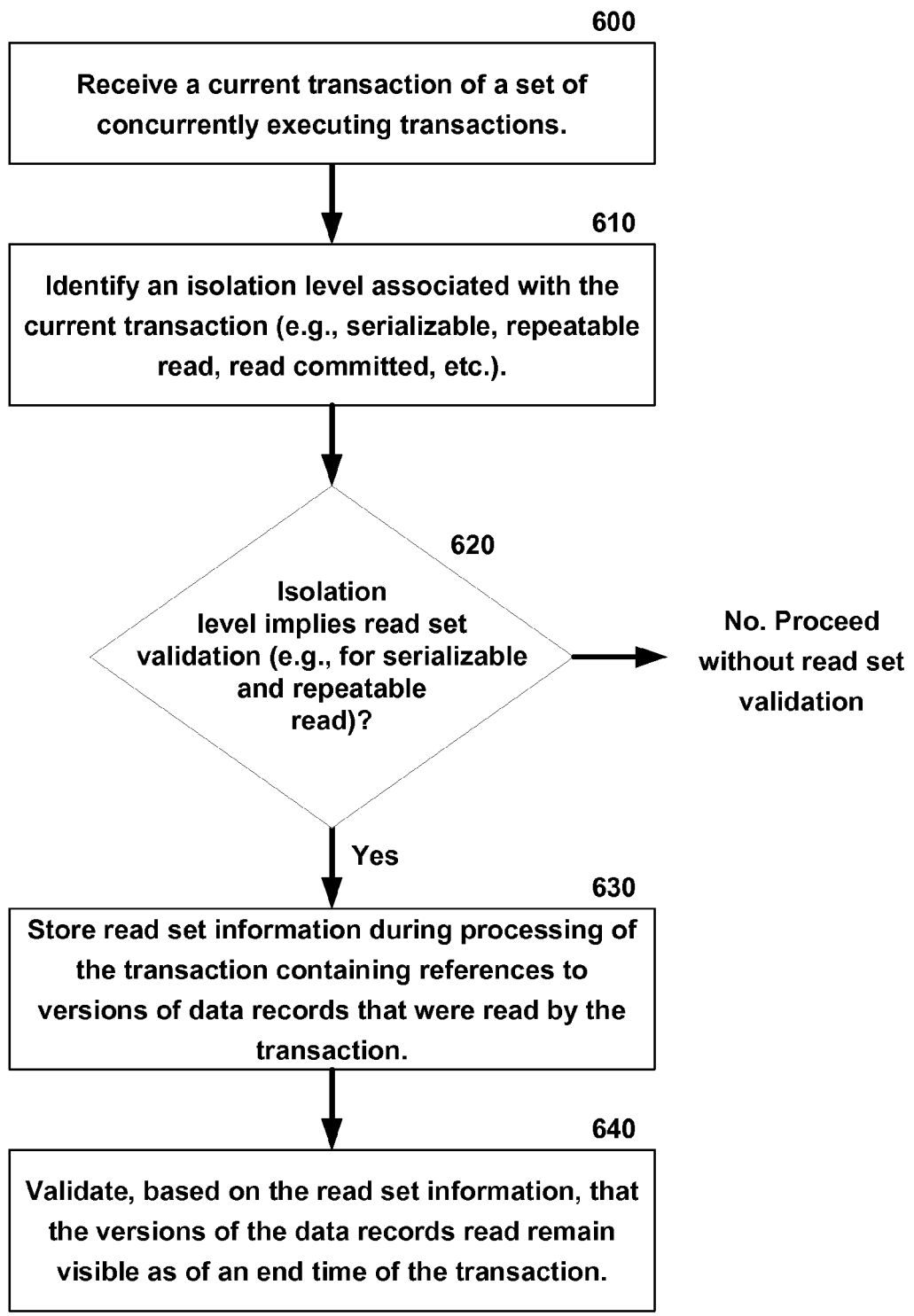
FIG. 6 is another flow diagram illustrating an exemplary non-limiting process for performing phantom checking for data transactions in a snapshot isolation system.

FIG. 6 is a flow diagram illustrating an exemplary non-limiting process for performing read set validation for data transactions in a snapshot isolation system. At 600, a current transaction of a set of concurrently executing transactions is received. At 610, an isolation level associated with the current transaction is identified (e.g., serializable, repeatable read, read committed, etc.). At 620, if the isolation level implies that read set validation is to be performed (e.g., for serializable and repeatable read), then at 630, read set information associated the transaction is stored during processing including references to versions of data records that were read by read operations of the transaction. Then, at 640, based on the read set information, it is validated for the transaction that the versions of the data records read remain visible as of an end time of the transaction. If at 620, the isolation level indicates no read set validation is to be performed (e.g., for read committed) the flow proceeds without read set validation.

Figure 7:
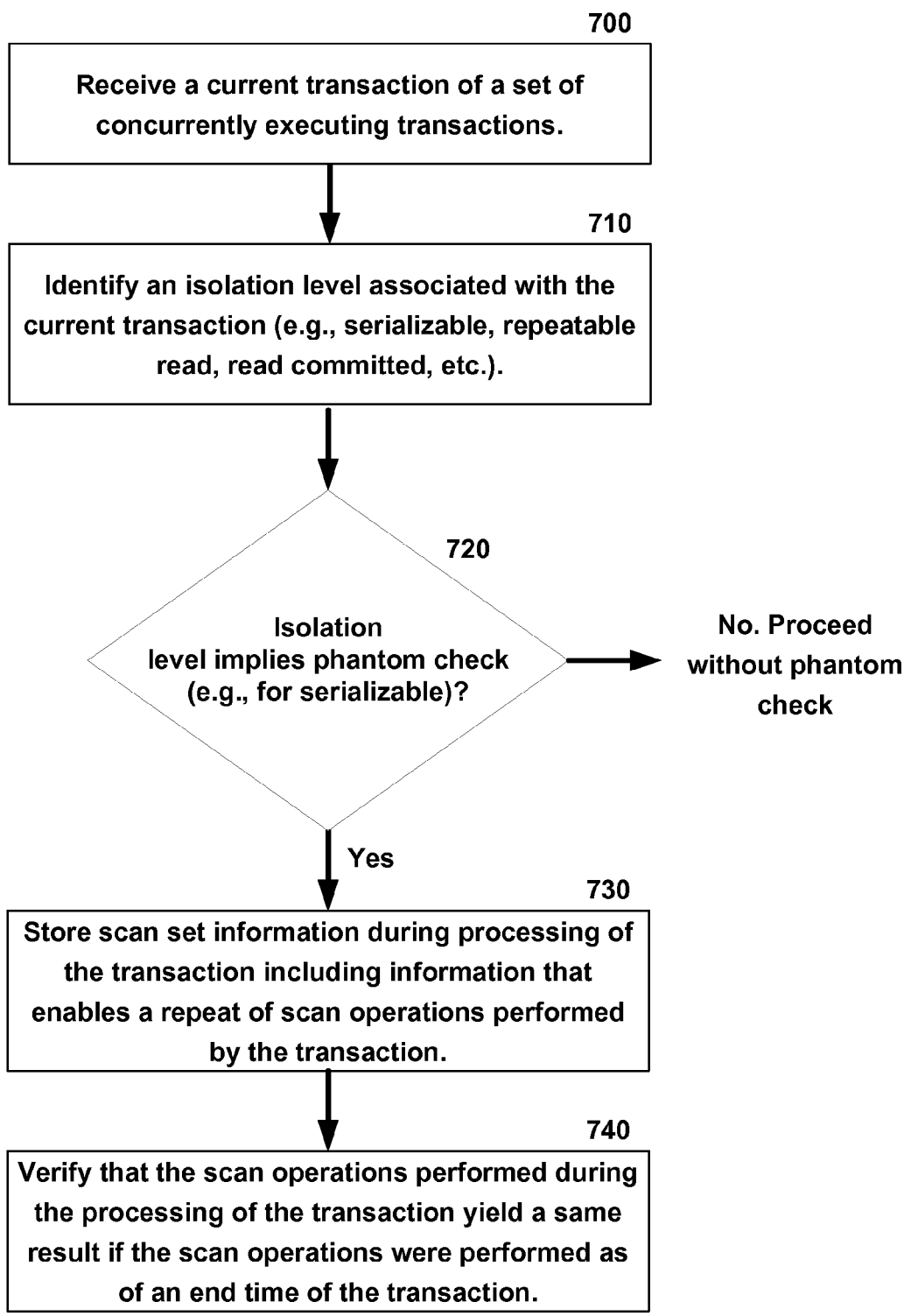
FIG. 7 is still another flow diagram illustrating an exemplary non-limiting process where the start time or the end time of a version of a data item remain in doubt until resolution of the doubt in accordance with an embodiment.

FIG. 7 is another flow diagram illustrating an exemplary non-limiting process for performing phantom checking for data transactions in a snapshot isolation system. At 700, a current transaction of a set of concurrently executing transactions is received. At 710, an isolation level associated with the current transaction is identified (e.g., serializable, repeatable read, read committed, etc.). At 720, if the identified isolation level implies that a phantom check is to be performed (e.g., for serializable), then at 730, scan set information associated the transaction is stored during processing including information that enables a repeat of scan operations performed by the transaction. Then, at 740, it is verified that the scan operations performed during the processing of the transaction yield a same result if the scan operations were performed as of an end time of the transaction. If at 720, the isolation level indicates no phantom check is to be performed (e.g., for repeatable read and read committed) the flow proceeds without phantom check.

Non-Limiting Implementations, Examples and Pseudo-Code

Some general concepts surrounding the various embodiments of the subject disclosure have been described above. While some non-limiting implementation specific details were also given above, the below description includes a variety of additional implementation and design specific details that should also not be taken as limiting on the more general concepts and embodiments described elsewhere herein, and are included merely for illustrative purposes.

For instance, in this section, some more details are given relating to processing during the phases and events of the life of a transaction and some non-limiting choices for algorithms that can be used for serializable snapshot isolation are also described. In this regard, at the start of a transaction, it can be assumed that it is unknown whether it is a read-write or read-only transaction. As another assumption for the presently described embodiments implicating pointers (or other references), the pointers (or other references) to transaction objects and version objects are stable, i.e., an object is not moved or deleted while a pointer (or other reference) is held on the object. This can be implemented using reference counting or other related techniques as well.

With respect to begin transaction events, e.g., event 100 of FIG. 1, in one embodiment, a begin transaction method defines a process that returns a pointer to a new transaction object, e.g., as represented by the following non-limiting pseudo-code. In the following pseudo code snippets, Tx refers to a transaction, EndTs refers to end timestamp, StartTs refers to start timestamp, State refers to transaction state, ReadSet, ScanSet and WriteSet refer to the read set, scan set and write set that are tracked for purposes of validation. DepCnt refers to dependency count. DepFailed refers to dependency failed. CmtDepIn refers to commit dependencies incoming and CmtDepOut refers to commit dependencies outstanding. EventC refers to the event counter. TxTable refers to transaction table.

| Method BeginTransaction, returns pointer to a transaction object |
| --- |
| 1. Tx = new transaction object ;<br>2. Tx.TxEndTs = 0 ;<br>3. Tx.TxState = Active ;<br>4. Set Tx.TxReadSet, Tx.TxScanSet and Tx.TxWriteSet to empty ;<br>5. Tx.CmtDepCnt = 1; Tx.TxDepFailed = false ;<br>6. Set Tx.CmtDepIn and Tx.TxCmtDepOut to empty ;<br>7. Tx.TxStartTs = TxEventC.NextSequenceNumber( );<br>8.<br>9. // Make it visible to other transactions<br>10. Add Tx to TxTable ;<br>11. Return Tx ; |

With respect to the normal processing phase, such as normal processing phase 110 of FIG. 1, the transaction does its normal processing during this phase, performing reads, updates, inserts and deletes of records. In one embodiment, record access is assumed via hash indices and a table may have multiple such hash indices. A hash index has a hash key (a set of fields) and may have an associated unique constraint.

To locate a target record and the appropriate version via a hash index, the hash bucket is determined and its chain of record versions is scanned. Versions that satisfy the search predicate and are visible to the transaction are returned. None, one or multiple records (but only one version for each record) may be returned depending on the search predicate and uniqueness constraints.

When beginning a hash chain scan, an entry is appended to the transaction's TxScanSet to record which bucket chain and which search predicate were used. This is used for all scans, even scans on unique indices because a new record may be inserted on a chain where there was no hit during normal processing.

With respect to version check, the following non-limiting algorithm snippet shows how to verify that a version is visible to the current transaction and handle commit dependencies. IsVersionVisible may return a commit dependency Exemplary, non-limiting algorithms making use of IsVersionVisible and AddDependency can be represented, e.g., by the following non-limiting pseudo-code.

In the following pseudo code snippets, RecordPtr refers to record pointer, Ptr refers to pointer, Tx refers to a transaction, TxPtr refers to transaction pointer, CmtDepOnTx refers to commit dependencies on transaction, and AddtoReadSet refers to adding to the read set.

| Method VersionCheck |
| --- |
| 1. RecordPtr = ptr to current version ;<br>2. TxPtr = ptr to current transaction ;<br>3.<br>4. // Check whether the version is visible to the transaction<br>5. CmtDepOnTx = null ;<br>6. IsVisible = IsVersionVisible(RecordPtr, TxPtr, out CmtDepOnTx) ;<br>7.<br>8. If( !IsVisible ) begin<br>9. // Even though the version is not visible, a commit dependency<br>10. // on its end timestamp may be needed.<br>11. If( CmtDepOnTx != null and version satisfies search predicate) begin<br>12.   If(!TxPtr->AddDependency(CmtDepOnTx)) Abort ;<br>13. end<br>14. Return NULL ;<br>15. End<br>16.<br>17. // The version is visible based on its timestamps<br>18. If (version does not satisfy search predicate) return NULL;<br>19.<br>20. // and it satisfies the predicate so the version is good.<br>21. // Record dependency, if any, and add to read set<br>22. If( CmtDepOnTx != null and !TxPtr->AddDependency(CmtDepOnTx)) Abort ;<br>23. TxPtr->AddToReadSet(RecordPtr) ;<br>24.<br>25. Return RecordPtr to the reader. |

With respect to updates of a version, once a target version for an update has been found, performing the update can include the steps in the following non-limiting algorithm snippet. In this regard, the function IsVersionUpdatable (see further below) checks whether the target version is updatable and returns the VersionEndTs, referring to version end timestamp, on which the decision was made.

In the following pseudo code snippets, terms are used similar to the above examples, and in addition OldVersionPtr refers to old version pointer, NewVersionPtr refers to new version pointer, VersionStartTs refers to version start timestamp, TxID refers to transaction ID, Tx refers to transaction, TxStartTs refers to transaction start timestamp, VersionEndTs refers to version end timestamp, and IsGarbage refers to a Boolean property described above.

Method UpdateVersion

1. Tx = pointer to the current transaction;
2. OldVersionPtr = pointer to the target version of the update;
3.
4. // IsVersionUpdatable also returns the timestamp value on
5. // which the decision was made.
6.
7. // Check if version is updatable. If not, a write-write conflict exists.
8. If( !IsVersionUpdatable(OldVersionPtr, VersionEndTs)) Abort ;
9.
10. // Proceed with installing the new version
11. NewVersionPtr = Create the new version.
12. NewVersionPtr-> VersionStartTs = ToTxId(Tx->TxStartTs ) ;
13. NewVersionPtr-> VersionEndTs = Max timestamp;
14. NewVersionPtr-> IsGarbage       = false;
15. Using Compare-and-Swap:
16. If ( OldVersionPtr-> VersionEndTs == VersionEndTs)
17.          OldVersion->VersionEndTs = ToTxId(Tx->TxStartTs );
18. If ( compare-and-swap failed) begin
19.   // If VersionEndTs was from an aborted transaction, perhaps it has changed
20.   // to Max timestamp which is also OK. Try again with Max timestamp.
21.   Using Compare-and-Swap:
22.   If( OldVersionPtr-> VersionEndTs == Max timestamp)
23.          OldVersion->VersionEndTs = ToTxId(Tx->TxStartTs );
24.   If( compare-and-swap failed) begin
25.     // Another transaction "sneaked in" after the call to IsVersionUpdatable.
26.     Discard the new version and abort.
27.   end
28. end
29. Add (NewVersionPtr, OldVersionPtr) to Tx->TxWriteSet.
30. Insert the new version into hash indices on the table. On any hash index with a uniqueness constraint, also verify that the new version does not violate the constraint. If it does, return a constraint violation error.

IsVersionUpdatable returns the timestamp value on which it based its decision. When it returns true, the timestamp value is either a) a maximum timestamp indicating the version is the latest version, or b) the end timestamp of a transaction that has aborted, but not yet completed its postprocessing.

Setting the end timestamp in the old version signals other writers that there is a pending update, which prevents them from overwriting the new version. This step is done atomically. However, the new version is not visible to any currently active transactions except the current transaction, so adding the new version to indices does not have to be done atomically. It can become visible to other transaction after the current transaction commits.

With respect to inserting a new record, in one embodiment, a process similar to update is provided, except there is no old version and thus those portions of the process relating to the old version are omitted.

With respect to deleting a record, in one embodiment, a process similar to update is provided, except new versions are not created and thus those portions of the process relating to the new version are omitted.

A brief explanation of the handling of aborted transactions may be in order. When a transaction T1 aborts, it acquires an end timestamp, sets its state to Aborted and proceeds to postprocessing. During postprocessing, T1 sets the IsGarbage flag in any new versions that it created and resets VersionEndTs to Max timestamp in old versions. T1's transaction object and T1's new versions (marked IsGarbage) are later garbage collected in the normal way.

A version is garbage and not visible to any transaction when it is marked as garbage (IsGarbage is set to true) or its VersionStartTs references an aborted transaction. A version is the latest version and unconditionally updatable if its VersionStartTs indicates a committed transaction and its VersionEndTs equals Max timestamp or references an aborted transaction. If VersionStartTs references a transaction T1 that is still validating, it is only conditionally updatable, that is, a commit dependency on T1 is required.

Provided solely for illustration and not limitation, the following IsVersionVisible algorithm determines whether a version is visible as of a certain point in time. The algorithm does not rely on any ordering of versions—visibility is determined solely based on data in the version itself.

The sample algorithm includes doing some postprocessing lazily and attempting to minimize wait times. In particular, allowing another transaction to sneak in as soon as a transaction aborts and before it has fixed up its new and old versions adds to the complexity, but allows for higher levels of concurrency. References, such as ptr refers to pointer, Tx refers to transaction, are similar to other examples herein.

Sample Algorithm IsVersionVisible
        (In RecordPtr: ptr to record,
         In TxPtr: ptr to transaction,
         Out CmtDepOnTx: ptr to transaction on which there is a commit dependency
        ) returns Boolean
     1. MyStart = TxPtr->TxStartTs ;
     2. MyEnd = TxPtr->TxEndTs ;
     3.
     4. // Determine whether validating or doing normal processing?
     5. Validating = (TxPtr->TxState == Validating) ;
     6.
     7. // MyTs is the point in time visibility is checked for
     8. MyTs = if( Validating ) MyEnd else MyStart;
     9.
    10. // Acquire a snapshot of the condition variables used by this routine.
    11. // Note that this snapshot is neither consistent (can be in mid-flight of transaction)
    12. // nor is it stable (the values could change as soon as the values are read).
    13. //
    14. VnStart = RecordPtr->VersionStartTs;
    15. VnEnd = RecordPtr->VersionEndTs;
    16.
    17. // Commit dependencies are ptrs to transactions

```
18. CmtDepOnTx = null ;
19.
20. // Filter out garbage.
21. if (RecordPtr->IsGarbage) return false ;
22.
23. // Fast path - taken when both timestamps are final.
24. //
25. If (!IsTxId (VnStart) and !IsTxId (VnEnd)) begin
26.    Return (VnStart < MyTs and MyTs < VnEnd);
27. End
28.
29. // Deal with versions that were deleted
30. //
31. // During normal processing, versions that were deleted cannot be seen.
32. // During validation, versions that were deleted can be seen.
33. //
34. If( RecordPtr->VersionEndTs == MyStart) return Validating ;
35.
36. // Deal with versions that were created
37. //
38. // If this version had been deleted, deletion caused by this transaction
39. // and would have been handled by the immediately preceding test
40. // as only uncommitted versions created by this transaction can be seen.
41. // Thus, this version is the last one and is visible
42. // during normal processing and validation.
43. //
44. If( RecordPtr->VersionStartTs == MyStart) return true ;
45.
46.
47. // quicker path not available so take the other path.
48. // First, determine when this version became valid.
49. //
50. If (IsTxId (VnStart)) begin
51.
52.    // Get pointer to transaction that created the version
53.    T2Ptr = TxTable->GetTxPtr(ToTs(VnStart)) ;
54.    If( T2Ptr != null )begin
55.       // If T2 is Active, its changes are not visible
56.       If( T2Ptr->TxState == Active) return false ;
57.       // If T2 has aborted, the version is garbage.
58.       If( T2Ptr->TxState == Aborted ) return false ;
59.
60.       // T2 is no longer active, so it has an end timestamp and it is final (not in doubt)
61.       VnStart = T2Ptr->TxEndTs ;
62. else begin
63.
64.       // T2 has disappeared but it must have completed postprocessing
65.       // so now the start timestamp can be obtained from the record
66.       If( RecordPtr->IsGarbage) return false ;
67.       VnStart = RecordPtr->VersionStartTs ;
68. End
69.
70.    // The start time of the version is known. Try to bail out early.
71.    // If transaction too old to see this version, it doesn't matter whether
72.    // T2 commits or aborts - can't be seen in any case.
73.    If (VnStart > MyTs) return false;
74.
75.    // Check whether T2 has completed or is still validating
76.    If( T2Ptr != null ) begin
77.       If( T2Ptr->TxState == Aborted ) return false ;
78.
79.       // If T2 is still validating, a commit dependency on T2 can be taken. If still
80.       // validating present Tx, dependency already obtained, so no need for again.
81.       If( T2Ptr->TxState == Validating and !Validating) CmtDepOnTx = T2Ptr ;
82.
83.    Else begin
84.       If( RecordPtr->IsGarbage) return false ;
85.    End
86.    End
87. // If the start timestamp was final, the previous block was skipped,
88. // so check here also.
89.    If (VnStart > MyTs) return false;
90.
91. // At this point, whether the start time is earlier than MyTs is known.
92. // T2, the transaction that created the version, has either committed or
93. // is still validating. If T2 is validating, a commit dependency on T2 is recognized.
94.
95. // Second, determine whether and when the version became invalid.
96. //
97. // Re-read timestamp, if final, process complete.
```

-continued

```
98. VnEnd = RecordPtr->VersionEndTs;
99. If (!IsTxId(VnEnd)) return (MyTs < VnEnd) ;
100.
101.        // VnEnd is not final, get pointer to transaction that replaced this version
102. T3Ptr = TxTable->GetTxPtr(ToTs(VnEnd));
103. If( T3Ptr != null) begin
104.
105.    // If T3 is Active, this is the latest version
106.    If(T3Ptr->TxState == Active ) return true ;
107.
108.    // T3 is no longer active so it has a stable end timestamp
109.    VnEnd = T3Ptr->TxEndTs ;
110.
111.    // If the version is visible according to VnEnd, then it will
112.    // remain visible regardless of whether T3 aborts or commits.
113.    If( MyTs < VnEnd) return true ;
114.
115.    // If T3 has committed, the version is no longer visible
116.    // because it is known that MyTs > VnEnd.
117.    If( T3Ptr->TxState == Committed ) return false;
118.
119.    // If T3 is validating, assume that it will commit and return false
120.    // but guard this by taking a commit dependency on T3.
121.    // This may overwrite a commit dependency on T2 but that is OK
122.    // because T3 already has a commit dependency on T2.
123.    // However, if still validating, a commit dependency is not taken, rather
124.    // it is conservatively assumed that T3 will commit and return false.
125.    If( T3Ptr->TxState == Validating) begin
126.      If( !Validating ) CmtDepOnTx = T3Ptr ;
127.      Return false ;
128.    End
129.
130. // T3 has aborted, but another transaction T4 may have sneaked in
131. // after the abort and created another replacement.
132. // Re-read end timestamp and check.
133. VnEnd = RecordPtr->VersionEndTs ;
134. // If the end timestamp is unchanged since read, T3 not finished postprocessing.
135. If( ToTs(VnEnd) == T3Ptr->TxEndTs ) return true ;
136. // If the end timestamp is equal to max timestamp, T3 completed postprocessing
137.    // and there is no T4.
138.    If( VnEnd == Max timestamp ) return true ;
139.
140. Else begin
141.
142.    // T3 has disappeared so postprocessing is complete.
143.    // If T3 aborted, another transaction T4 may have sneaked in and
144.    // created another replacement.
145.    VnEnd = RecordPtr->VersionEndTs ;
146.    If (!IsTxId(VnEnd)) return (MyTs < VnEnd) ;
147.
148. End
149.
150. // Another transaction T4 has changed the end timestamp.
151. // This means that T4 was active after this routine started.
152. // Assuming routine entry time is later than MyTs, T4 has or will get an
153. // end timestamp that's after MyTs which means that the version's
154. // end timestamp will be after MyTs.
155. // Consequently, the version is visible to me.
156.
157. Return true ;
```

Provided solely for illustration and not limitation, the following AddDependency algorithm adds a commit dependency to the target transaction. Add Dependency returns true if a) the target transaction has already committed, b) the current transaction already has a commit dependency on target transaction, or c) the dependency was successfully added. If the dependency was added, the target transaction is guaranteed to process the dependency when it commits or aborts. It returns false if the transaction has already aborted or if the commit dependency could not be added; in either case, the calling transaction should abort.

References, such as ptr refers to pointer, Tx refers to transaction, are similar to other examples herein. In addition, Trgt refers to target.

```
Sample Algorithm AddDependency( MyTxPtr: pointer to current
transaction,
            TrgtTxPtr: ptr to target of commit dependency
            ) returns Boolean
1. TrgtTxId = TrgtTxPtr->TxStartTs ;
2.
3. // A commit dependency may already exist on the target transaction
4. If ( TrgtTxId already in MyTxPtr->TxCmtDepOut) return true ;
5. // Add the dependency to the list so it is not taken out again
    unnecessarily
6. Add TrgTxId to MyTxPtr->TxCmtDepOut ;
7.
8. // Did the target transaction commit or abort already?
9. TrgtTxState = TrgtTxPtr->TxState ;
```

-continued

```
10. If ( TrgtTxState == Committed) return true ;
11. If ( TrgtTxState == Aborted ) return false ;
12.
13. // Addition to next free slot in target transaction's array.
14. // The loop is guaranteed to finish because the array is of fixed size.
15. Count = −1 ;
16. While (!TrgtTxPtr->CmtDep.Closed ) do
17.    Count = TrgtTxPtr->TxCmtDepIn.Count ;
18.    If ( Count >= TrgtTxPtr->TxCmtDepIn.ArraySize) return false ;
19.    // There is an empty slot - try to grab it.
20.    Using compare-and-swap:
21.    If(TrgtTxPtr->TxCmtDepIn.Count == Count)
22.         TrgtTxPtr->TxCmtDepIn.Count = Count+1 ;
23.    If( compare-and-swap succeeded ) exit loop ;
24.
25.    // Some other transaction took the slot, try again
26.    Count = −1 ;
27. End while ;
28.
29. If( Count < 0 ) return (TrgtTxPtr->TxState == Committed) ;
30.
31. // Obtained the slot, install dependency
32. Atomically increment MyTxPtr->TxCmtDepCnt ;
33. TrgtTxPtr->TxCmtDepIn.TxIdArray[Count] = MyTxPtr->TxStartTs ;
34.
35. // Make sure that the dependency is processed
36. If(TrgtTx->CmtDep.Closed ) begin
37.    // The target transaction may or may not process the dependency -
       not sure.
38.    // But the transaction committed or aborted, so can perform
       processing anyway
39.    Using compare-and-swap:
40.    If(TrgtTxPtr->TxCmtDepIn.TxIdArray[Count] == MyTxPtr-
       >TxStartTs)
41.         TrgtTxPtr->TxCmtDepIn.TxIdArray[Count] = 0 ;
42.    If ( compare-and-swap succeeds ) begin
43.        // dependency obtained, now process it.
44.        Atomically decrement MyTxPtr->TxCmtDepCnt ;
45.        return (TrgtTxState == Committed) ;
46.    End
47.    // The target transaction has already processed it - that works
48. End
49. // Still open to guarantee the target transaction will process it
50. Return true ;
```

In one embodiment that follows the first-writer-wins rule, an update can only be applied to the latest committed version. Once a transaction T1 has found a target version for an update, it is verified that it is the latest committed version and that no other transaction T2 has an update pending on it. If there is a pending update, T1 aborts following the first-writer-wins rule.

The sample algorithm below determines whether a version is updatable. In this example, it is assumed that IsVersionVisible has already be applied to the version so it has been added to the transaction's read set and any required commit dependencies have been taken. IsVersionVisible also returns the value of VersionEndTs on which the decision was made. This value is used later to check that VersionEndTs of the old version has not changed between the time the decision was made and the time when the new version is installed.

```
Algorithm IsVersionUpdatable (
        VersionPtr: pointer to record version,
        VersionEndTs: output, the version end timestamp used for decision
        ) returns Boolean
1. // Make a copy of end timestamp
2. VersionEndTs = VersionPtr->VersionEndTs;
3.
4. // Is this the latest version?
5. If( VersionEndTs == Max timestamp) return true ;
6.
7. // The version was replaced by a transaction T2 that is either
8. // active, validating, committed or aborted.
9.
10. // Has T2 committed and finalized the version end timestamp?
11. If( !IsTxId(VersionEndTs)) return false ;
12.
13. // Check transaction object to find out T2's state
14. TxPtr = TxTable->GetTxPtr(ToTs(VersionEndTs)) ;
15.
16. If( TxPtr != null ) begin
17.
18.    If( TxPtr->TxState == Aborted) return true ;
19.    // If T2 has committed, the version is not updatable.
20.    // If T2 is active or validating, the first-writer-wins rule is followed
21.    // and also report the version as not updatable
22.    Return false ;
23.
24. End
25.
26. // No transaction object implies T2 completed postprocessing.
27. // However, another transaction T3 may have created a new version.
28. // Re-read version end timestamp to find out what happened.
29. VersionEndTs = VersionPtr->VersionEndTs ;
30. // If a Max timestamp is observed, T2 aborted (and possibly
       other writers)
31. // and there are no pending updates on the version.
32. If( VersionEndTs == Max timestamp ) return true ;
33.
34. // T2 committed or there is a pending update. In either case,
35. // the version is not updatable.
36. Return false ;
```

There are various non-limiting optimizations from lines 14-36 of IsVersionUpdatable. Suppose a transaction T1 wants to update a version that was updated by another transaction T2 that has aborted. The logic from line 14 on checks whether T1 can be allowed to proceed even if T2 has not completed its postprocessing. Under the assumption that the vast majority of transactions commit, it may not be worthwhile looking up the transaction object in the faint hope that the transaction has aborted, but not yet completed postprocessing.

There is a small chance that another transaction T3 may come in between the two reads of VersionEndTs (line 2 and line 29), detect that T2 has aborted and attach a new version. T3 could be in any state but is given the benefit of doubt by aborting the current transaction under the assumption that T3 has or will commit. This is consistent with the first-writer-wins rule.

A precommit event, such as precommit event 120 of FIG. 1, ends the normal processing and begins the validation phase, such as validation phase 130 of FIG. 1. At this time, in a non-limiting embodiment of the dual timestamps for snapshot isolation as described herein, the transaction's end timestamp is acquired and its state is set to Validating.

```
Algorithm Precommit( Tx: point to transaction object)
    1. Tx.TxEndTs = TxEventC.NextSequenceNumber( ) ;
    2. Tx.TxState = Validating ;
```

A read-only transaction has an empty write set. A read-only transaction has no validation phase and can thus immediately commit and discard the transaction object.

For the validation phase, such as validation phase 130 of FIG. 1, the reads of a read-write transaction are validated. As mentioned, validation includes two steps in one embodiment: a first check as to whether the versions read during the active phase are still visible as of the end of the transaction and a second check that there are no phantoms, which are versions that came into existence during the lifetime of this transaction and are visible to the transaction at commit time.

Figure 8:
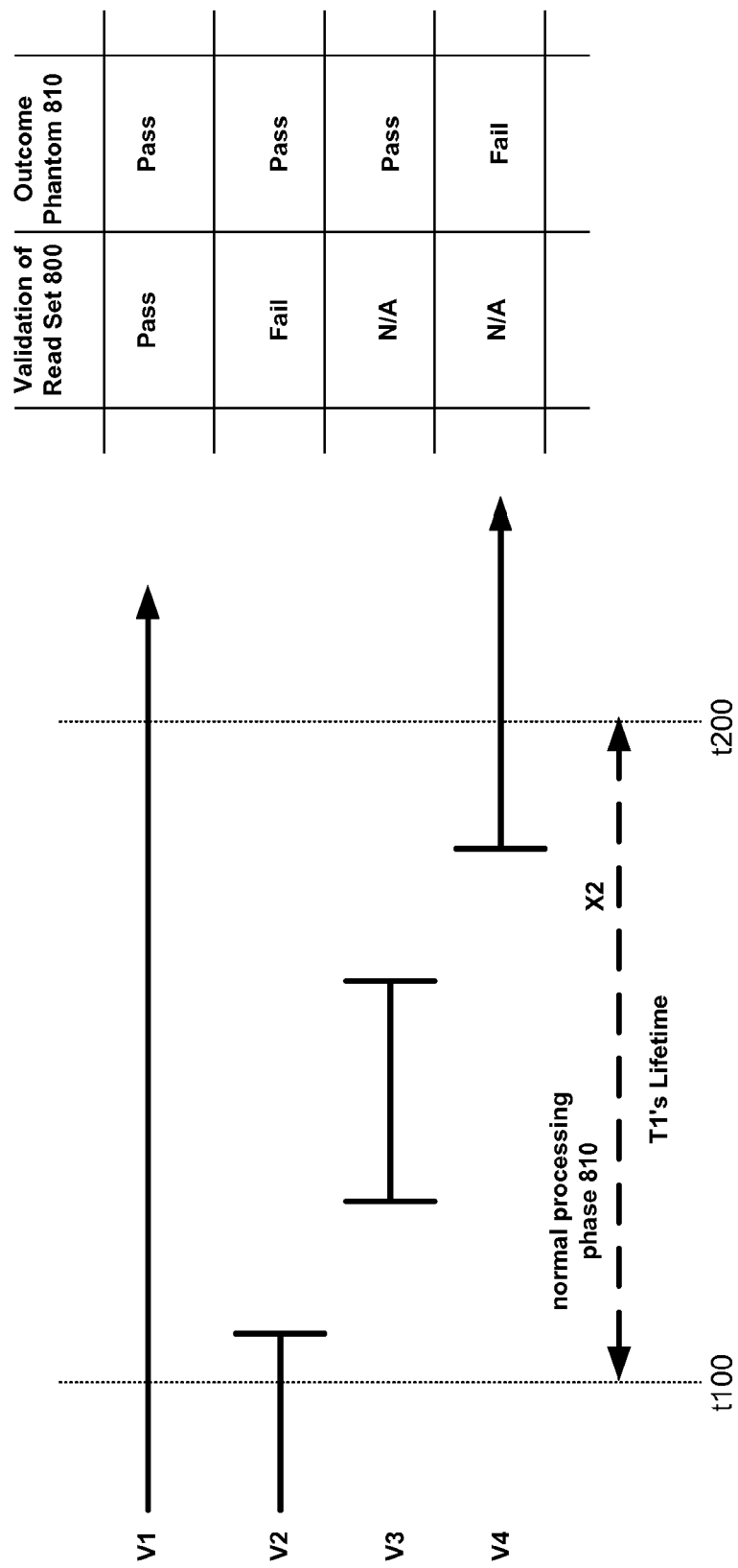
FIG. 8 is a timeline and corresponding chart illustrating exemplary operation of read set validation and phantom check in one or more embodiments.

FIG. 8 illustrates the different cases that can occur during the validation phase. A transaction T1 is shown with a lifetime of [time=t100, time=t200]. Four versions and their lifetime, and the expected outcome of read validation and phantom detection are illustrated for the two tests. For the sake of example, all four versions are assumed to satisfy the search predicates used by T1 and they were created and terminated by transactions other than T1.

Version V1 is visible to T1 both at its start timestamp and its end timestamp. Hence, it passes read validation and also phantom detection. Note that V1 may not be included in T1's read set—T1 may have terminated a scan early and never reached V2, though this is without consequence.

Version V2 is visible to T1 as of its start timestamp, but not at the end of the transaction. Provided that it is actually included in T1's read set, V2 fails read set validation. In any case, V2 is not a phantom.

Version V3 both began and ended during T1's lifetime so V3 is not visible to T1 at the start or at the end of the transaction. V3 thus is not included in T1's read set, and thus does not undergo read validation. V2 is not visible at the end of T1, and thus is not a phantom either.

Version V4 was created during T1's lifetime and is still alive at the end of T1. Hence, V4 is a phantom, but is not included in T1's read set because V4 was not visible as of T1's start time.

The following is a sample algorithm for ValidateReadset, which validates the read set.

```
Algorithm ValidateReadSet( Tx: pointer to transaction)
returns {Commit, Abort}
 1. MyStartTs = Tx->TxStartTs;
 2. MyEndTs = Tx->TxEndTs;
 3.
 4. // No validation needed for read-only transactions
 5. If( Tx->TxWriteSet is empty) return ;
 6.
 7. // First check visibility of the read set
 8. For each entry VPtr in Tx.TxReadSet do
 9.
10.  // Ignore versions that this transaction created, they are always visible
11.  If( ToTs(RecordPtr->VersionStartTs) != MyStartTs) continue
12.
13.  // Is what was read earlier still visible?
14.  // No, need to check search predicate, which was already read
26.  CmtDepOnTx = null ;
15.  If( !IsVersionVisible(VPtr, Tx, out CmtDepOnTx) ) return Abort ;
16.  // It is visible, but possibly with a commit dependency
17.  If( CmtDepOnTx != null and !Tx->AddDependency(CmtDepOnTx) )
     return Abort ;
18. End
19.
20. // Check for phantoms
21. For each entry ScanPtr in Tx->ScanSet do
22.  ChainHead = ScanPtr->ChainPtr ;
23.  RecordPtr = Pointer to first record in ChainHead ;
24.  While( RecordPtr != null) do
25.
26.   // Check for a potential phantom
27.   CmtDepOnTx = null ;
28.   PotentialPhantom = IsPotentialPhantom(RecordPtr, Tx, out CmtDepOnTx)) ;
29.
30.   If( !PotentialPhantom ) begin
31.    // Was there also a commit dependency?
32.    If( CmtDepOnTx != null and version satisfies search predicate) begin
33.     If (!Tx->AddDependency(CmtDepOnTx) ) return Abort ;
34.    End
35.   Else begin
36.
37.    // A potential phantom is present, but can ignore it if search predicate is false.
38.    // A commit dependency is not obtained when IsPotentialPhantom returns true.
39.    If ( version satisfies search predicate ) return Abort ;
40.   End
41.  End
42. End
43.
44. // Read set is fully validated
45. Discard Tx->TxReadSet and Tx->TxScanSet ;
46. Return Commit
```

For another sample Algorithm, IsPotentialPhantom checks whether, based on its timestamps alone, a version is a potential phantom. To be an actual phantom, it must also satisfy the search predicate used during the scan. IsPotentialPhantom does not wait, but it may return a commit dependency. If it returns true, it does not return a commit dependency. If it returns false, it may also return a commit dependency. A sample implementation is as follows:

```
Algorithm IsPotentialPhantom(
            RecordPtr: ptr to a record version,
            TxPtr: ptr to transaction,
            Out CmtDepOnTx: ptr to transaction on which a commit
            dependency exists
            ) returns Boolean
 1.RangeStartTs = TxPtr->TxStartTs ;
 2.RangeEndTs = TxPtr->TxEndTs ;
 3.
 4.// Version timestamps are volatile so work from a local copy
 5.VnStart = RecordPtr->VersionStartTs ;
 6.VnEnd = RecordPtr->VersionEndTs ;
 7.
 8.// No commit dependencies so far
 9.CmtDepOnTx = null ;
10.
11.// Ignore garbage
12.If( RecordPtr->IsGarbage) return false ;
13.
14.// Try fast path using the finalized version timestamp.
15.// Start timestamp must be within the range and
16.// end timestamp past the range for the version to be a phantom
17.If( !IsTxId(VnStart) and !IsTxId(VnEnd) ) begin
18.  Return ( RangeStartTs < VnStart and VnStart < RangeEndTs and
```

```
19.      RangeEndTs < VnEnd );
20. End
21.
22. // A version that the transaction created or replaced cannot be a phantom
23. If( ToTs(RecordPtr->VersionStartTs) == RangeStartTs ) return false ;
24. If( ToTs(RecordPtr->VersionEndTs) == RangeStartTs ) return false ;
25.
26. // Slow path using transaction objects.
27.
28. // First, determine when this version became valid
29. if ( IsTxId(VnStart) begin
30.    // Get transaction that created the version, call it T2
31.    T2Ptr = TxTable->GetTxPtr(ToTs(VnStart)) ;
32.
33.    If( T2Ptr == null ) begin
34.
35.       // A stable pointer is obtained to the transaction object.
36.       // Get the version's start timestamp from there.
37.       //
38.       // Precommitment obtained, so if T2 active, T2 commits after this transaction
39.       // in which case the version is not visible to this transaction.
40.       If( T2Ptr->TxState == Active) return false ;
41.
42.       // If T2 has aborted, the version is garbage and not visible.
43.       If (T2Ptr->TxState == Aborted) return false ;
44.
45.       // T2 has either committed or is still validating.
46.       // Assume optimistically that T2 will commit - otherwise,
47.       // an abort dependency should be tracked.
48.       // T2's end timestamp will be the start timestamp of the version.
49.       VnStart = T2Ptr->TxEndTs ;
50.
51.    Else begin
52.
53.       // T2 has disappeared so T2 completed postprocessing.
54.       If( RecordPtr->IsGarbage) return false ;
55.
56.       // T2 has committed and the version's start timestamps are finalized
57.       VnStart = RecordPtr->VersionStartTs ;
58.
59. End
60. // If the start timestamp is outside the range, the version is not a phantom.
61. If( VnStart < RangeStartTs or RangeEndTs < VnStart ) return false
62.
63. // The version's start timestamp falls in range, so the version could be a phantom
64. // but only if its end timestamp falls outside the range.
65.
66. // Reread version end timestamp - it might be final now.
67. VnEnd = RecordPtr->VersionEndTs ;
68. if( !IsTxId(VnEnd)) return (RangeEndTs < VnEnd) ;
69.
70. // If still not final, obtain pointer to transaction that replaced this version
71. T3Ptr = TxTable->GetTxPtr(ToTs(VnEnd));
72.
73. If( T3Ptr != null) begin
74.
75.    // If T3 is Active, a phantom has been identified regardless of whether
76.    // T3 commits or not.
77.    If(T3Ptr->TxState == Active ) return true ;
78.
79.    // T3 is no longer active so it has a stable end timestamp
80.    VnEnd = T3Ptr->TxEndTs ;
81.
82.    // If the version is visible according to VnEnd, a phantom is present
83.    // regardless of whether T3 aborts or commits.
84.    If( RangeEndTs < VnEnd) return true ;
85.
86.    // If T3 has committed, the version is not a phantom
87.    // because it is known that VnEnd < RangeEndTs.
88.    If( T3Ptr->TxState == Committed ) return false;
89.
90.    // If T3 is validating, an assumption is made that it will commit and return false
91.    // but this is guarded by taking a commit dependency on T3.
92.    If( T3Ptr->TxState == Validating) begin
93.       CmtDepOnTx = T3Ptr ;
94.       Return false ;
95.    End
96.
97. // T3 has aborted, but another transaction may have sneaked in
98. // after the abort and created another replacement.
```

-continued

```
 99. // Re-read version end timestamp. If it has not changed or
100. // is equal to max timestamp, a phantom has been identified.
101.   VnEnd = RecordPtr->VersionEndTs ;
102.   If( ToTs(VnEnd) == T3Ptr->TxStartTs ) return true ;
103.   If ( VnEnd == Max timestamp ) return true ;
104.
105.Else begin
106.
107.   // T3 has disappeared but it must have completed postprocessing.
108.   // If T3 aborted, another transaction may have sneaked in and
109.   // created another replacement. Thus, re-read end timestamp and check.
110.   VnEnd = RecordPtr->VersionEndTs ;
111.   If(!IsTxId(VnEnd)) return( RangeEndTs < VnEnd) ;
112.
113.End
114.
158.// Another transaction T4 has changed the end timestamp.
159.// This means that T4 must have been active after this routine started.
160.// The entry time of the routine is later than RangeEndTs. T4 has or will get an
161.// end timestamp that is after RangeEndTs, which means that the version's
162.// end timestamp will be after RangeEndTs.
163.// Consequently, a phantom has been identified.
164.
165.Return true ;
```

With respect to commit and abort events, such as commit/abort events 140 of FIG. 1, when ValidateReadSet returns, the transaction may still have outstanding commit dependencies. If it returns Abort, the transaction can abort immediately. If it returns Commit, the transaction waits until the dependencies have been resolved.

With respect to committing a transaction, a sample algorithm for CommitTransaction attempts to commit a read-write transaction. In the sample embodiment, new versions created by the transaction are written to the persistent redo log. Then a commit record is written and the state is set to Committed or Aborted depending on the outcome of the write. It is incumbent on the caller to check whether the commit succeed or failed and proceed accordingly.

It is noted that a strong ordering of the log is not required. The commit order can be reconstructed from the end timestamps in the begin and commit log records. Every log record also records to which transaction it belongs so their ordering in the log is also immaterial. A sample CommitTransaction algorithm is as follows:

```
Algorithm CommitTransaction(Tx: pointer to transaction object)
 1.  If ( Tx->TxCmtDepCnt > 1) wait until dependencies are resolved;
 2.
 3.  // Write the redo log.
 4.  // a simple version is shown here - an actual implementation
 5.  // can opt to pack the redo log into as few log buffers as possible.
 6.  Create a begin transaction record containing Tx->TxStartTs
     and Tx->TxEndTs
 7.  and write it to the redo log;
 8.  For each entry Wse in Tx->Writeset do
 9.    Write the version pointed to by Wse->NewVersionPtr to the
       redo log.
10.    Include the version's VersionStartTs in the log record so it is known
       to
11.    which transaction the log record belongs.
12. End
13.
14. // Do the commit
15. Create a commit record containing Tx->TxStartTs and Tx->TxEndTs
    and
16. write it to the redo log;
17. Wait for log writes to complete ;
18. If( log writes fail) Tx->TxState = Aborted
```

-continued

```
19. Else         Tx->TxState = Committed ;
20.
21. Return ;
```

With respect to an abort transaction, aborting a transaction does not require any redo logging so setting its state to Aborted can be performed without additional steps. Marking the new versions created by the transaction as garbage is done during the postprocessing phase. A sample AbortTransaction algorithm is as follows:

```
Algorithm AbortTransaction( Tx)
 1.  // No redo logging needed -aborting
 2.  // If an end timestamp is not present, obtain it now
 3.  If (Tx->TxEndTs == Max timestamp)
 3.    Tx.TxEndTs = TxEventC.NextSequenceNumber( ) ;
 4.  Tx->TxState = Aborted ;
```

With respect to the postprocessing phase and termination, such as postprocessing phase 150 and termination event 160 of FIG. 1, during the postprocessing phase, a committed transaction propagates its end timestamp to its new and old versions. An aborted transaction sets the IsGarbage flag in its new versions and attempts to reset the end timestamp to Max timestamp. However, transactions are not forced to wait for the postprocessing of an aborted transaction to finish so another transaction may already have detected the abort, created a new version and reset the end timestamp of the old version. If so, the aborted transaction does not reset the end timestamp of the old version.

The transaction also processes incoming commit dependencies during postprocessing. If the transaction aborted, the source transactions are also instructed to abort. If the transaction committed, the source transaction's dependency count is decremented. If a source transaction happens to be suspended, it is restarted if the current transaction aborted or the dependency count went down to zero. Restarting a suspended transaction depends on the threading model, thus such details are left unspecified.

Once postprocessing is done, other transactions no longer need to refer to this transaction object. The transaction object can be removed from the transaction table, but not yet discarded because its write set can be used for garbage collecting its old versions once they are no longer needed. Sample pseudocode for a PostprocessCommitted algorithm is as follows:

```
Algorithm PostprocessCommitted( Tx: pointer to a transaction object)
1.   MyEndTs = Tx->TxEndTs ;
2.   For each entry Wse in Tx->Writeset do
3.     NewVersionPtr = Wse->NewVersionPtr ;
4.     If( NewVersionPtr != null)
5.       NewVersionPtr-> VersionStartTs = MyEndTs ;
6.     OldVersionPtr = Wse->OldVersionPtr ;
7.     If( OldVersionPtr != null )
8.       OldVersionPtr->VersionEndTs = MyEndTs ;
9.   End loop
10.
11.  Tx->ProcessDependencies( ) ;
12.  Tx->Is_Terminated = true ;
```

Sample pseudocode for a PostprocessAborted algorithm is as follows:

```
Algorithm PostprocessAborted( Tx: pointer to a transaction object)
1.  For each entry Wse in Tx->Writeset do
2.    NewVersionPtr = Wse->NewVersionPtr ;
3.    If( NewVersionPtr != null)
4.      NewVersionPtr->IsGarbage = true ;
5.    OldVersionPtr = Wse->OldVersionPtr ;
6.    If( OldVersionPtr != null ) begin
7.      // Done atomically because another transaction
8.      // may have detected that abort and already created a new version
9.      Using compare-and-swap:
13.     If ( OldVersionPtr->VersionEndTs == Tx->TxStartTs)
14.       OldVersionPtr->VersionEndTs = Max timestamp ;
15.     // The compare-and-swap may fail, but that is OK
16.   End
17. End loop
18. Tx->ProcessDependencies( ) ;
19. Tx->Is_Terminated = true ;
```

Sample pseudocode for a ProcessDependencies algorithm is as follows:

```
Algorithm ProcessDependencies( )
1.  // Process incoming commit dependencies
2.  TxSmtDepIn.Closed = true ;
3.
4.  For( i=0; i<TxCmtDepIn.Count; i++) begin
5.    SrcTxId = TxCmtDepIn.TxIdArray[i];
6.    If( SrcTxId == 0 ) begin
7.      // Have a non-empty slot, try to grab the transaction id
8.      Using compare-and-swap:
9.      If(TxCmtDepIn.TxIdArray[i] == SrcTxId )
          TxCmtDepIn.TxIdArray[i] = 0 ;
10.     If( compare-and-swap succeeds) begin
11.       SrcTx = TxTable->GetTxPtr(SrcTxId) ;
12.       If( SrcTx != null) begin
13.
14.         // Nothing to do if transaction has already aborted
15.         If( SrcTx->TxState == Aborted) continue ;
16.
17.         // What to do depends on whether this transaction aborted or committed
18.         If( TxState == Aborted ) begin
19.
20.           // Tell SrTx to abort but do it atomically so it is instructed once
21.           While (!SrcTx->TxDepFailed ) do
22.             Use compare-and-swap:
23.             If( SrcTx->TxDepFailed == false) SrcTx->TxDepFailed = true ;
24.             If ( compare-and-swap succeeded ) begin
25.               If (SrcTx is suspended) do what is needed to restart SrcTx ;
26.             End
27.           End loop
28.
29.         Else begin
30.
31.           // reached committed state, go tell SrcTx
32.           While (true) do
33.             Cnt = SrcTx->TxCmtDepCnt ;
34.             Use compare-and-swap:
35.             If( SrcTx->TxCmtDepCnt == Cnt ) SrcTx->TxCmtDepCnt = Cnt-1 ;
36.             If ( compare-and-swamp succeeded) begin
37.               // wake up if count went to zero
38.               If( Cnt == 1 and SrcTx is suspended)
39.                 do what is needed to restart SrcTx (depending) ;
40.               end
41.             End loop
42.
43.         End else
44.       End
45.       // Source transaction is already gone
46.     End
47.     // Dependency already processed
48.   End
49.   // Slot is empty
50. End loop
51.
```

Exemplary Networked and Distributed Environments

One of ordinary skill in the art can appreciate that the various embodiments of the optimistic serializable snapshot isolation systems and methods described herein can be implemented in connection with any computer or other client or server device, which can be deployed as part of a computer network or in a distributed computing environment, and can be connected to any kind of data store where snapshots can be made. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the concurrency control mechanisms as described for various embodiments of the subject disclosure.

Figure 9:
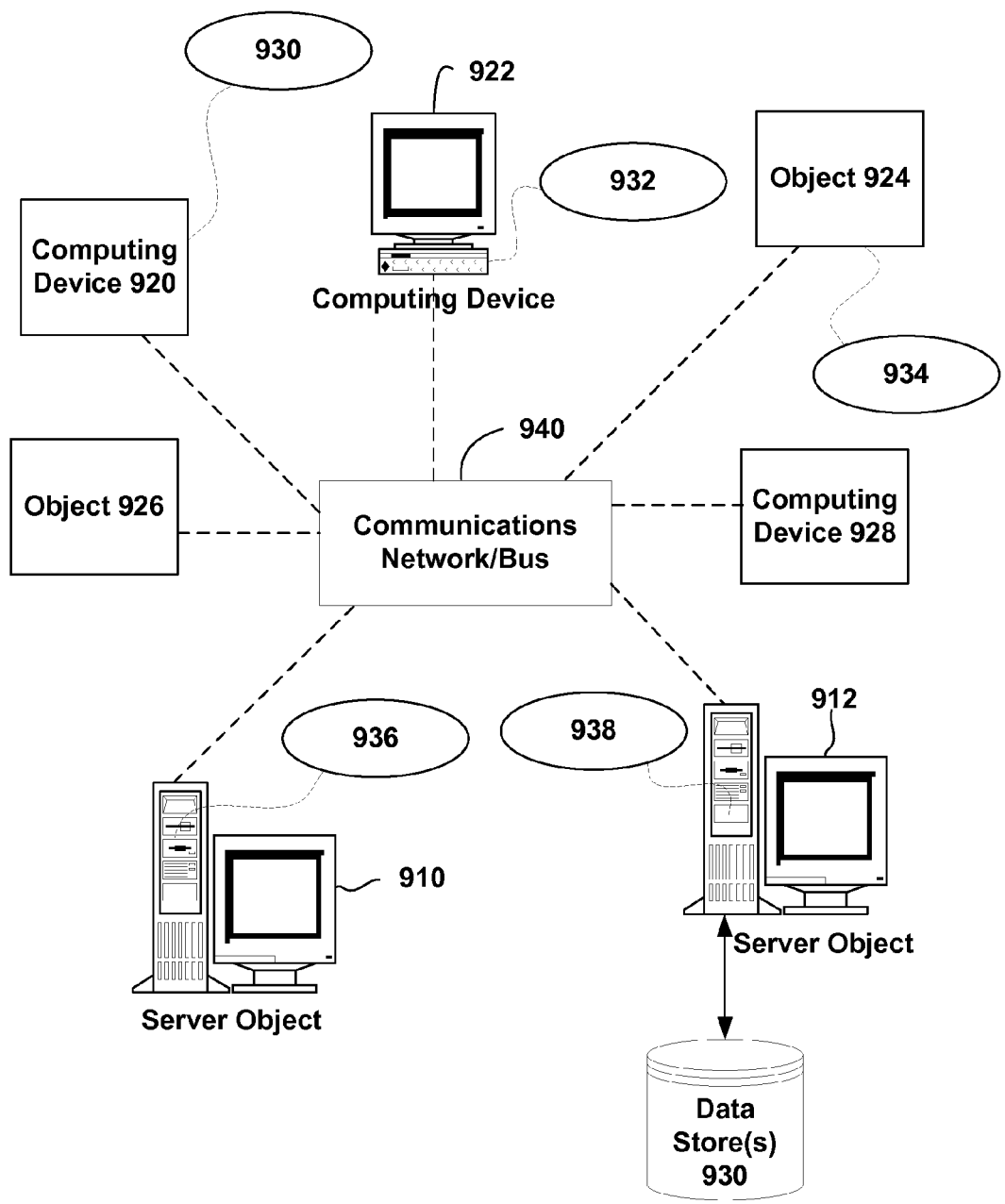
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that objects 910, 912, etc. and computing objects or devices 920, 922, 924, 926, 928, etc. may comprise different devices, such as PDAs, audio/video devices, mobile phones, MP3 players, personal computers, laptops, etc.

Each object 910, 912, etc. and computing objects or devices 920, 922, 924, 926, 928, etc. can communicate with one or more other objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each object 910, 912, etc. or 920, 922, 924, 926, 928, etc. can also contain an application, such as applications 930, 932, 934, 936, 938, that might make use of an API, or other object, software, firmware and/or hardware, suitable for communication with or implementation of the concurrency control provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the serializable snapshot isolation systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computers 920, 922, 924, 926, 928, etc. can be thought of as clients and computers 910, 912, etc. can be thought of as servers where servers 910, 912, etc. provide data services, such as receiving data from client computers 920, 922, 924, 926, 928, etc., storing of data, processing of data, transmitting data to client computers 920, 922, 924, 926, 928, etc., although any computer can be considered a client, a server, or both, depending on the circumstances. Any of these computing devices may be processing data, or requesting transaction services or tasks that may implicate the concurrency control techniques for snapshot isolation systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 940 is the Internet, for example, the servers 910, 912, etc. can be Web servers with which the clients 920, 922, 924, 926, 928, etc. communicate via any of a number of known protocols, such as the hypertext transfer protocol (HTTP). Servers 910, 912, etc. may also serve as clients 920, 922, 924, 926, 928, etc., as may be characteristic of a distributed computing environment.

Exemplary Computing Device

Figure 10:
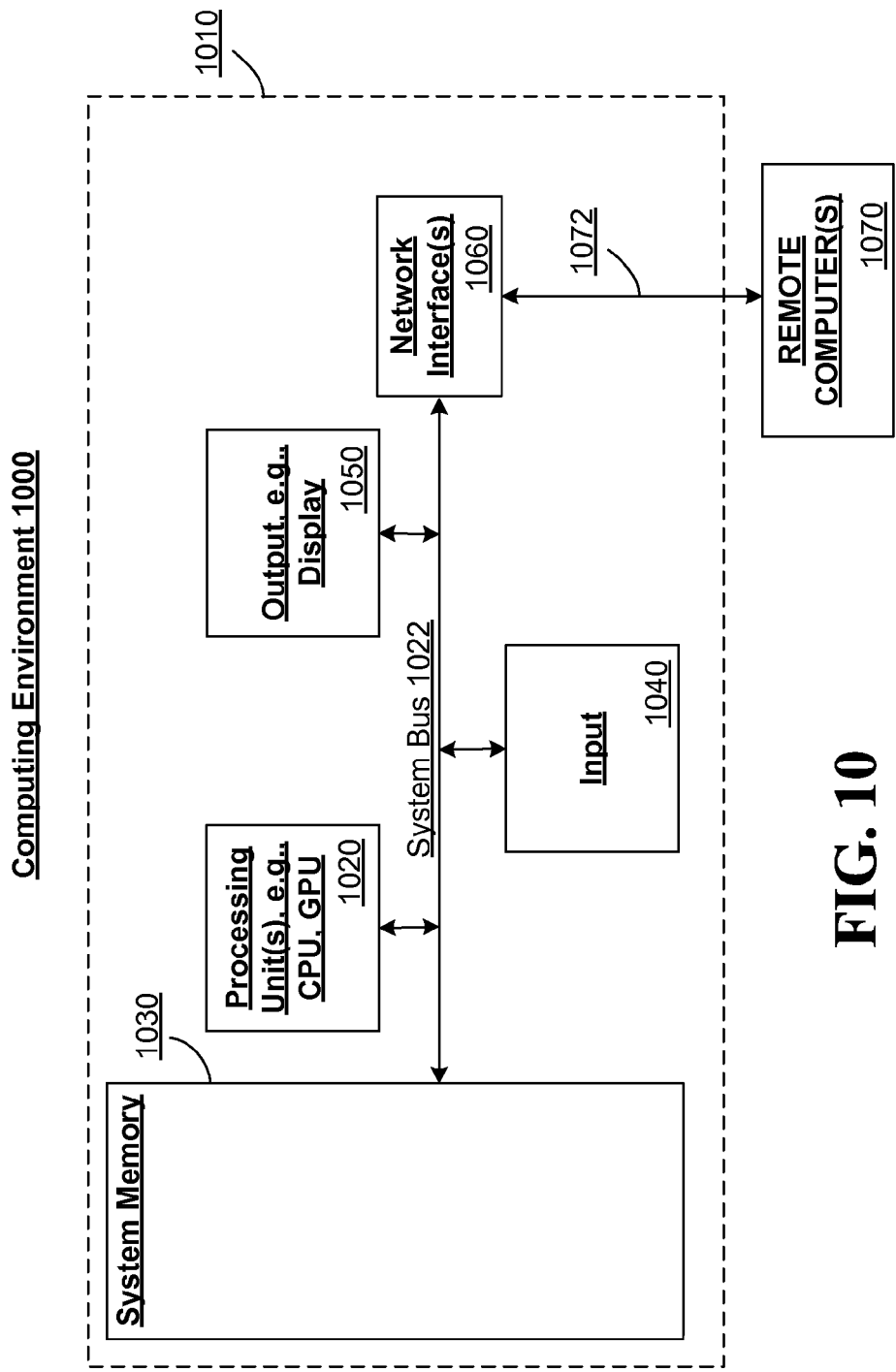
FIG. 10 is a block diagram representing an exemplary non-limiting computing system or operating environment in which one or more aspects of various embodiments described herein can be implemented.

As mentioned, advantageously, the techniques described herein can be applied to any device where it is desirable to perform provide serializable snapshot isolation. It should be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 10 is but one example of a computing device. Additionally, a database server can include one or more aspects of the below general purpose computer, such as concurrency control component or transaction manager, or other database management server components.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to read and/or write transactions with high reliability and under potential conditions of high volume or high concurrency.

Also, there are multiple ways to implement the same or similar functionality, e.g., an appropriate API, tool kit, driver code, operating system, control, standalone or downloadable software object, etc. which enables applications and services to take advantage of the transaction concurrency control techniques. Thus, embodiments herein are contemplated from the standpoint of an API (or other software object), as well as from a software or hardware object that implements one or more aspects of the concurrency control including validation tests described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. An optimistic multiversion concurrency control system comprising:
    a concurrency control component configured to:
        provide optimistic multiversion concurrency control and enforce isolation among concurrently executing transactions, and
        provide at least one level of isolation for an individual transaction having data read operations followed by data write operations; and
    a computing device configured to execute the concurrency control component,
    wherein, to provide the at least one level of isolation, the concurrency control component is further configured to:
        store a read set of the individual transaction, wherein the read set identifies the data read operations of the individual transaction, verify that the data read operations of the read set of the individual transaction would yield the same result were the data reads to be repeated after the data write operations, when each of the data read operations of the read set are verified to yield the same result, switch the individual transaction to a committed state, and when an individual data read operation of the read set is not verified to yield the same result, not switch the individual transaction to the committed state.

2. The optimistic multiversion concurrency control system according to claim 1, wherein the concurrency control component is configured to assign at least two timestamps to a version of a record operated on by the individual transaction.

3. The optimistic multiversion concurrency control system according to claim 2, wherein the at least two time stamps include a begin time that is conditional upon the individual transaction committing or aborting.

4. The optimistic multiversion concurrency control system according to claim 2, wherein the at least two timestamps include an end time for a lifetime of the version.

5. The optimistic multiversion concurrency control system according to claim 4, wherein the end time is conditional upon at least one dependent transaction committing or aborting.

6. The optimistic multiversion concurrency control system according to claim 2, wherein an individual timestamp of the at least two timestamps is finalized in a post-processing phase after the individual transaction has committed.

7. The optimistic multiversion concurrency control system according to claim 1, wherein the concurrency control component is configured to verify the data read operations of the read set using at least two timestamps.

8. The optimistic multiversion concurrency control system according to claim 1, wherein the concurrency control component is configured to validate the data read operations of the read set at commit time for the individual transaction.

9. The optimistic multiversion concurrency control system according to claim 1, wherein the concurrency control component is configured to store a scan set of the individual transaction during processing of the individual transaction.

10. The optimistic multiversion concurrency control system according to claim 9, wherein the concurrency control component is configured to detect phantoms using the scan set.

11. The optimistic multiversion concurrency control system according to claim 1, wherein the concurrency control component is configured to provide at least one of read committed level of isolation, repeatable read level of isolation, or serializable level of isolation independently for the concurrently executing transactions.

12. A method for providing concurrency control for transactions, the method comprising:

identifying a first isolation level associated with a first transaction that updates first data records stored in a database to generate new versions of the first data records, wherein the first isolation level indicates that read set validation is to be performed for the first transaction;

identifying a second isolation level associated with a second transaction that updates second data records stored in the database, wherein the second isolation level indicates that read set validation is not to be performed for the second transaction;

determining whether to perform read set validation for the first transaction based on the first isolation level and for the second transaction based on the second isolation level;

responsive to the determining, performing read set validation for the first transaction, including:

storing read set information associated with processing the first transaction including storing references to versions of individual first data records that were read by read operations of the first transaction; and validating, based on at least the read set information, that the versions of the individual first data records remain visible as of an end time of the first transaction; and responsive to the determining, not performing read set validation for the second transaction, wherein at least the performing read set validation is performed by a computing device.

13. The method of claim 12, wherein the first isolation level is serializable isolation.

14. The method of claim 12, wherein the first isolation level is repeatable read.

15. The method of claim 12, wherein the second isolation level is read committed.

16. A method for providing concurrency control for transactions, the method comprising:

identifying a first isolation level associated with a first transaction that updates first data records stored in a database to generate new versions of the first data records, wherein the first isolation level indicates that phantom checking is to be performed for the first transaction;

identifying a second isolation level associated with a second transaction that updates second data records stored in the database, wherein the second isolation level indicates that phantom checking is not to be performed for the second transaction;

determining whether to perform phantom checking for the first transaction based on the first isolation level and for the second transaction based on the second isolation level;

responsive to the determining, performing phantom checking for the first transaction, including:

storing scan set information associated with processing the first transaction including information that enables a repeat of scan operations performed by the first transaction, and verifying that the scan operations performed during the processing of the first transaction yield a same result if the scan operations were repeated as of an end time of the first transaction; and responsive to the determining, not performing phantom checking for the second transaction, wherein at least the performing phantom checking is performed by a computing device.

17. The method of claim 16, wherein the verifying includes verifying that scans of at least part of an ordered index implicated by the scan operations yield the same result if the scan operations were repeated as of the end time of the first transaction.

18. The method of claim 16, wherein the verifying includes verifying that scans of at least one hash table implicated by the scan operations yield the same result if the scan operations were repeated as of the end time of the first transaction.

19. The method of claim 16, wherein the first isolation level is serializable.

20. The method of claim 16, wherein the second isolation level is repeatable read.

21. The method of claim 16, wherein the second isolation level is read committed.

22. The optimistic multiversion concurrency control system according to claim 1, wherein the concurrency control component is further configured to switch the individual transaction to an aborted state when the individual data read operation of the read set is not verified to yield the same result.

* * * * *